United States Patent
Krishnan

(10) Patent No.: US 8,086,232 B2
(45) Date of Patent: Dec. 27, 2011

(54) TIME SYNCHRONIZED WIRELESS METHOD AND OPERATIONS

(75) Inventor: Venkatraman G. Krishnan, Shrewsbury, MA (US)

(73) Assignee: Enterasys Networks, Inc., Andover, MA (US)

( * ) Notice: Subject to any disclaimer, the term of this patent is extended or adjusted under 35 U.S.C. 154(b) by 849 days.

(21) Appl. No.: 11/476,424

(22) Filed: Jun. 28, 2006

(65) Prior Publication Data

US 2007/0078974 A1 Apr. 5, 2007

Related U.S. Application Data

(60) Provisional application No. 60/694,560, filed on Jun. 28, 2005, provisional application No. 60/694,554, filed on Jun. 28, 2005.

(51) Int. Cl.
  *H04W 4/00* (2009.01)
(52) U.S. Cl. .................................. 455/434; 455/41.2
(58) Field of Classification Search .......... 455/434, 455/41.2, 41.1, 515, 450, 452.1, 464, 15, 455/502, 503, 507, 509, 511, 526
  See application file for complete search history.

(56) References Cited

U.S. PATENT DOCUMENTS

| | | | |
|---|---|---|---|
| 3,941,936 A * | 3/1976 | Graham et al. | ............. 370/363 |
| 4,627,052 A | 12/1986 | Hoare et al. | |
| 4,734,907 A | 3/1988 | Turner | |
| 4,823,338 A | 4/1989 | Chan et al. | |
| 4,939,726 A | 7/1990 | Flammer et al. | |
| 5,076,688 A | 12/1991 | Bowen et al. | |
| 5,090,025 A | 2/1992 | Marshall et al. | |
| 5,095,480 A | 3/1992 | Fenner | |
| 5,132,926 A | 7/1992 | MacEachern et al. | |
| 5,136,580 A | 8/1992 | Videlock et al. | |
| 5,173,933 A | 12/1992 | Garner et al. | |
| 5,243,652 A | 9/1993 | Teare et al. | |
| 5,289,460 A | 2/1994 | Drake, Jr. et al. | |
| 5,331,637 A | 7/1994 | Francis et al. | |
| 5,355,371 A | 10/1994 | Auerbach et al. | |
| 5,355,375 A | 10/1994 | Christensen | |
| 5,361,256 A | 11/1994 | Doeringer et al. | |
| 5,367,667 A | 11/1994 | Wahlquist et al. | |

(Continued)

FOREIGN PATENT DOCUMENTS

EP 1154624 11/2001

(Continued)

OTHER PUBLICATIONS

"802.1 Plenary Meeting Agenda," IEEE 802.1 Meeting, LaJolla, CA, Mar. 11, 1996.

(Continued)

*Primary Examiner* — Jean Gelin
*Assistant Examiner* — Michael Nguyen
(74) *Attorney, Agent, or Firm* — Holland & Knight LLP; Brian J. Colandreo, Esq.; J. Mitchell Herbert, Jr., Esq.

(57) ABSTRACT

A scanning method, computer readable medium, and device for suspending, during a first data scanning sequence including a plurality of discrete data scanning intervals, data scanning operations during at least one discrete data scanning interval chosen from the plurality of discrete data scanning intervals. A data transmission operation is performed during the at least one discrete data scanning interval.

17 Claims, 6 Drawing Sheets

U.S. PATENT DOCUMENTS

| | | |
|---|---|---|
| 5,394,402 A | 2/1995 | Ross |
| 5,396,493 A | 3/1995 | Sugiyama |
| 5,400,326 A | 3/1995 | Smith |
| 5,428,615 A | 6/1995 | Backes et al. |
| 5,434,855 A | 7/1995 | Perlman et al. |
| 5,442,633 A | 8/1995 | Perkins et al. |
| 5,444,702 A | 8/1995 | Burnett et al. |
| 5,448,565 A | 9/1995 | Chang et al. |
| 5,475,781 A | 12/1995 | Chang et al. |
| 5,481,540 A | 1/1996 | Huang |
| 5,485,455 A | 1/1996 | Dobbins et al. |
| 5,491,694 A | 2/1996 | Oliver et al. |
| 5,500,860 A | 3/1996 | Perlman et al. |
| 5,506,838 A | 4/1996 | Flanagan |
| 5,511,168 A | 4/1996 | Perlman et al. |
| 5,517,494 A | 5/1996 | Green |
| 5,517,620 A | 5/1996 | Hashimoto et al. |
| 5,519,760 A | 5/1996 | Borkowski et al. |
| 5,521,910 A | 5/1996 | Matthews |
| 5,530,703 A | 6/1996 | Liu et al. |
| 5,550,816 A | 8/1996 | Hardwick et al. |
| 5,553,083 A | 9/1996 | Miller |
| 5,583,861 A | 12/1996 | Holden |
| 5,606,602 A | 2/1997 | Coyle et al. |
| 5,608,726 A | 3/1997 | Virgile |
| 5,613,069 A | 3/1997 | Walker |
| 5,621,793 A | 4/1997 | Bednarek et al. |
| 5,634,011 A | 5/1997 | Auerbach et al. |
| 5,640,452 A | 6/1997 | Murphy |
| 5,659,617 A | 8/1997 | Fischer |
| 5,675,582 A | 10/1997 | Hummel et al. |
| 5,684,800 A | 11/1997 | Dobbins et al. |
| 5,727,057 A | 3/1998 | Emery et al. |
| 5,729,680 A * | 3/1998 | Belanger et al. ............... 709/222 |
| 5,734,865 A | 3/1998 | Yu |
| 5,740,171 A | 4/1998 | Mazzola et al. |
| 5,742,604 A | 4/1998 | Edsall et al. |
| 5,745,685 A | 4/1998 | Kirchner et al. |
| 5,752,003 A | 5/1998 | Hart |
| 5,754,657 A | 5/1998 | Schipper et al. |
| 5,757,916 A | 5/1998 | MacDoran et al. |
| 5,781,726 A | 7/1998 | Pereira |
| 5,781,737 A | 7/1998 | Schmidt |
| 5,790,074 A | 8/1998 | Rangedahl et al. |
| 5,812,819 A | 9/1998 | Rodwin |
| 5,825,772 A | 10/1998 | Dobbins et al. |
| 5,862,338 A | 1/1999 | Walker et al. |
| 5,874,964 A | 2/1999 | Gille |
| 5,881,236 A | 3/1999 | Dickey |
| 5,892,451 A | 4/1999 | May et al. |
| 5,892,910 A | 4/1999 | Safadi |
| 5,892,912 A | 4/1999 | Suzuki et al. |
| 5,898,686 A | 4/1999 | Virgile |
| 5,905,779 A | 5/1999 | Steinmetz |
| 5,920,699 A | 7/1999 | Bare |
| 5,922,073 A | 7/1999 | Shimada |
| 5,963,556 A | 10/1999 | Varghese et al. |
| 5,983,364 A | 11/1999 | Bortcosh |
| 5,999,126 A | 12/1999 | Ito |
| 6,005,864 A | 12/1999 | Krause |
| 6,006,259 A | 12/1999 | Adelman et al. |
| 6,012,088 A | 1/2000 | Li et al. |
| 6,018,771 A | 1/2000 | Hayden |
| 6,035,105 A | 3/2000 | McCloghrie et al. |
| 6,041,166 A | 3/2000 | Hart et al. |
| 6,044,400 A | 3/2000 | Golan et al. |
| 6,061,797 A | 5/2000 | Jade et al. |
| 6,070,079 A | 5/2000 | Kuwahara |
| 6,076,114 A | 6/2000 | Wesley |
| 6,078,957 A | 6/2000 | Adelman et al. |
| 6,085,243 A | 7/2000 | Fletcher et al. |
| 6,094,434 A | 7/2000 | Kotzur et al. |
| 6,105,027 A | 8/2000 | Schneider et al. |
| 6,105,064 A | 8/2000 | Davis et al. |
| 6,108,365 A | 8/2000 | Rubin et al. |
| 6,115,754 A | 9/2000 | Landgren |
| 6,122,664 A | 9/2000 | Boukobza et al. |
| 6,130,890 A | 10/2000 | Leinwand et al. |
| 6,131,120 A | 10/2000 | Reid |
| 6,151,324 A | 11/2000 | Belser et al. |
| 6,151,631 A | 11/2000 | Ansell et al. |
| 6,157,647 A | 12/2000 | Husak |
| 6,167,275 A | 12/2000 | Oros et al. |
| 6,167,513 A | 12/2000 | Inoue et al. |
| 6,192,045 B1 | 2/2001 | Williams |
| 6,192,403 B1 | 2/2001 | Jong et al. |
| 6,201,789 B1 | 3/2001 | Witkowski et al. |
| 6,205,126 B1 | 3/2001 | Moon |
| 6,212,391 B1 | 4/2001 | Saleh et al. |
| 6,216,159 B1 | 4/2001 | Chintakrindi et al. |
| 6,222,840 B1 | 4/2001 | Walker et al. |
| 6,230,018 B1 | 5/2001 | Watters et al. |
| 6,233,242 B1 | 5/2001 | Mayer et al. |
| 6,236,365 B1 | 5/2001 | LeBlanc et al. |
| 6,256,338 B1 | 7/2001 | Jalloul et al. |
| 6,259,404 B1 | 7/2001 | Parl et al. |
| 6,273,622 B1 | 8/2001 | Ben-David |
| 6,286,044 B1 | 9/2001 | Aoyama et al. |
| 6,304,218 B1 | 10/2001 | Sugiura et al. |
| 6,308,273 B1 | 10/2001 | Goertzel et al. |
| 6,317,500 B1 | 11/2001 | Murphy |
| 6,327,474 B1 | 12/2001 | Ruutu et al. |
| 6,327,535 B1 | 12/2001 | Evans et al. |
| 6,343,317 B1 | 1/2002 | Glorikian |
| 6,363,422 B1 | 3/2002 | Hunter et al. |
| 6,370,629 B1 | 4/2002 | Hastings et al. |
| 6,388,618 B1 | 5/2002 | Stilp et al. |
| 6,421,009 B2 | 7/2002 | Suprunov |
| 6,442,394 B1 | 8/2002 | Valentine et al. |
| 6,442,616 B1 | 8/2002 | Inoue et al. |
| 6,453,237 B1 | 9/2002 | Fuchs et al. |
| 6,456,853 B1 | 9/2002 | Arnold |
| 6,460,084 B1 | 10/2002 | Van Horne et al. |
| 6,466,786 B1 | 10/2002 | Wallenius |
| 6,480,495 B1 | 11/2002 | Mauger et al. |
| 6,523,064 B1 | 2/2003 | Akatsu et al. |
| 6,539,229 B1 | 3/2003 | Ali |
| 6,542,813 B1 | 4/2003 | Kovacs |
| 6,556,831 B1 | 4/2003 | Buppelmann |
| 6,580,914 B1 | 6/2003 | Smith |
| 6,583,713 B1 | 6/2003 | Bates |
| 6,640,184 B1 | 10/2003 | Rabe |
| 6,640,248 B1 | 10/2003 | Jorgensen |
| 6,665,715 B1 | 12/2003 | Houri |
| 6,701,864 B2 | 3/2004 | Watson et al. |
| 6,716,101 B1 | 4/2004 | Meadows et al. |
| 6,741,863 B1 | 5/2004 | Chiang et al. |
| 6,757,545 B2 | 6/2004 | Nowak et al. |
| 6,757,740 B1 | 6/2004 | Parekh et al. |
| 6,771,639 B1 | 8/2004 | Holden |
| 6,778,818 B1 | 8/2004 | O'Neil |
| 6,795,688 B1 | 9/2004 | Plasson et al. |
| 6,799,049 B1 | 9/2004 | Zellner et al. |
| 6,807,427 B1 | 10/2004 | Sakamoto et al. |
| 6,813,501 B2 | 11/2004 | Kinnunen et al. |
| 6,826,385 B2 | 11/2004 | Kujala |
| 6,826,617 B1 | 11/2004 | Ansell et al. |
| 6,834,195 B2 | 12/2004 | Brandenberg et al. |
| 6,859,791 B1 | 2/2005 | Spagna et al. |
| 6,889,051 B2 | 5/2005 | Ogino et al. |
| 6,889,053 B1 | 5/2005 | Chang et al. |
| 6,920,329 B2 | 7/2005 | Kennedy et al. |
| 6,934,548 B1 | 8/2005 | Gould et al. |
| 6,937,988 B1 | 8/2005 | Hemkumar et al. |
| 6,938,096 B1 | 8/2005 | Greschler et al. |
| 6,941,143 B2 * | 9/2005 | Mathur ..................... 455/452.1 |
| 6,983,313 B1 | 1/2006 | Korkea-Aho |
| 6,985,731 B1 | 1/2006 | Johnson et al. |
| 7,010,583 B1 | 3/2006 | Aizono et al. |
| 7,089,264 B1 | 8/2006 | Guido et al. |
| 7,120,449 B1 | 10/2006 | Muhonen et al. |
| 7,136,915 B2 | 11/2006 | Rieger, III |
| 7,139,820 B1 | 11/2006 | O'Toole et al. |
| 7,197,556 B1 | 3/2007 | Short et al. |
| 7,266,839 B2 | 9/2007 | Bowers et al. |
| 2001/0022558 A1 | 9/2001 | Karr, Jr. et al. |
| 2001/0039623 A1 | 11/2001 | Ishikawa |

| | | | |
|---|---|---|---|
| 2002/0010866 | A1 | 1/2002 | McCullough et al. |
| 2002/0016831 | A1 | 2/2002 | Peled et al. |
| 2002/0023010 | A1 | 2/2002 | Rittmaster et al. |
| 2002/0034953 | A1 | 3/2002 | Tricarico |
| 2002/0046073 | A1 | 4/2002 | Indseth et al. |
| 2002/0051540 | A1 | 5/2002 | Glick et al. |
| 2002/0052180 | A1 | 5/2002 | Ravishankar et al. |
| 2002/0062379 | A1 | 5/2002 | Widegren et al. |
| 2002/0063656 | A1 | 5/2002 | Gutowski |
| 2002/0107029 | A1 | 8/2002 | Caughran et al. |
| 2002/0122055 | A1 | 9/2002 | Parupudi et al. |
| 2002/0138632 | A1 | 9/2002 | Bade et al. |
| 2002/0164996 | A1 | 11/2002 | Dorenbosch |
| 2002/0188842 | A1 | 12/2002 | Willeby |
| 2003/0035544 | A1 | 2/2003 | Herle et al. |
| 2003/0041167 | A1 | 2/2003 | French et al. |
| 2003/0065571 | A1 | 4/2003 | Dutta |
| 2003/0095509 | A1 | 5/2003 | Ramanan et al. |
| 2003/0185233 | A1 | 10/2003 | Ji et al. |
| 2003/0208523 | A1 | 11/2003 | Gopalan et al. |
| 2004/0064334 | A1 | 4/2004 | Nye |
| 2005/0199792 | A1 | 9/2005 | Argast et al. |
| 2006/0089138 | A1* | 4/2006 | Smith et al. ................ 455/426.1 |

FOREIGN PATENT DOCUMENTS

| | | |
|---|---|---|
| WO | 94/28683 | 12/1994 |
| WO | 97/05749 | 2/1997 |
| WO | 97/41654 | 11/1997 |
| WO | 98/19482 | 5/1998 |
| WO | 00/22862 | 4/2000 |
| WO | 00/44149 | 7/2000 |
| WO | 00/67450 | 11/2000 |
| WO | 00/69198 | 11/2000 |
| WO | 01/08425 | 2/2001 |
| WO | 01/22656 | 3/2001 |
| WO | 01/69956 | 9/2001 |
| WO | 01/76093 | 10/2001 |
| WO | 01/82259 | 11/2001 |
| WO | 01/94967 | 12/2001 |
| WO | 01/95505 | 12/2001 |
| WO | 02/09456 | 1/2002 |
| WO | 02/12914 | 2/2002 |

OTHER PUBLICATIONS

"802.1 Resolution on Progess of VLAN work," Jul. 1995, IEEE.
"802.1Thursday Agenda," IEEE 802.1 Meeting, University of Twente, Enschede, Netherlands, Jul. 11, 1996.
"Attachments Passed by Working Group 802.1," IEEE 802.1, Nov. 1995.
"Cisco IOS VLAN Services," Cisco Systems.
"Clearpoint Demonstrates Frame Relay Support in Interop Frame Relay Solutions Showcase," Clearpoint, Press Release dated Sep. 23, 1991
"Closing Plenary Minutes," IEEE 802.1 Meeting, LaJolla, CA, Mar. 14, 1996.
"Constellation Product Schedule," Apr. 22, 1992.
"Constellation Series" Clearpoint Research Corporation.
"Cyberlocator: A new Dimension in Network Security," retrieved from www.cyberlocator.com, Jul. 2002.
"DNS LOC: Geo-enabling the Domain System," retrieved from www.ckdhr.com/dns-loc/.
"End Station Tagging Presentation," Presentation Jun. 1996.
"Geographic Location/Privacy (geopriv)" retrieved from www.ietf.org, Jul. 2002.
"Geolocation Service Allows Web Sites to Identify Users' Geographic Locations," Business Geographics, May 2001.
"IEEE 802.1 1995 Document Register," IEEE, 1995.
"IEEE 802.1 Session Notes," IEEE 802.1 Meeting, Jul. 8, 1996 through Jul. 11, 1996.
"IEEE 802.1 Working Group, Minutes of the Mar. 1995 Meeting," West Palm Beach Florida, Mar. 1995.
"IEEE Standards for Local and Metropolitan Area Networks: Media Access Control (MAC) Bridges," IEEE, Technical Committee on Computer Communications of the IEEE Computer Society, Mar. 8, 1991, pp. 1-176.
"IEEE Standards for Local and Metropolitan Area Networks: Overview and Architecture," IEEE, Technical Committee on Computer Communications of the IEEE Computer Society, Dec. 21, 1990, pp. 1-31.
"Instructions to the Editor for P802.1j, and Ballot Summary," Jul. 12, 1995, P802.1-95/008, IEEE.
"Instructions to the Editor for the revision of Overview and Architecture," Jul. 12, 1995, P802.1-95/007, IEEE.
"Internet Protocol," DARPA Internet Program Protocol Specification: RFC 791, Sep. 1981, pp. 1-45.
"IP Multicast Streamlines Delivery of Multicast Applications," The Packet: Cisco Systems Use Magazine, V.7, No. 1, 1995.
"IP Packet Structure".
"ISO/TC211: Geographic Information/Geomatics Location based services possible standards," retrieved from www.isotc211.org/scope/htm.
"LAN Emulation over ATM Version 1.0," The ATM Forum Technical Committee, of-lane-0021.000, Jan. 1995, pp. 1-141.
"Location Pattern Matching & The RadioCamera Network," US Wireless 2001.
"Location Technologies for GSM, GPRS and WCDMA Networks," SnapTrack, White Paper, Nov. 2001.
"Multiprotocol Routing—From Constellation," Clearpoint Research Corporation, 1992.
New Cisco IOS VLAN Services Make 'Virtual' a Reality, Cisco VLAN Roadmap, Dec. 9, 1996.
"Newbury Networks Debuts First Location-Enabled Networks Solutions for 802.11B WLANS," retrieved from www.newburynetworks.com/newsroom.presslist.php?start=5, Sep. 2001.
"Proposed comments on ISO/IEC 10038/PDAM 2," Jul. 12, 1995, P802.1-95/009, IEEE.
"Proposed Comments on ISO/IEC 15802-5/PDAM 1," Jul. 12, 1995, P802.1-95/010, IEEE.
"Quick VLAN Standardization," IEEE 802.1 Meeting, Ottowa, Oct. 2, 1996.
"Real Time Location Systems and Wireless Local Area Networking: Combining Technologies for Optimum Asset Visibility and Supply Chain Management," Apr. 2001.
"Reliacast to Offer Enhanced Geographic Content Distribution Management Through Partnership with Quova," Mar. 6, 2001.
"Slithernet: A Proposal for Using Moderate-To-High-Speed Synchronous Serial Connections as a LAN-like Networking Medium", Jul. 1991.
"SpotON: Ad-hoc Location Sensing," retrieved from www.portolano.cs.washington.edu/projects/spoton, Jul. 2002.
"TCP-IP Distribution List for Nov. 1991," The Security Digest Archives, Nov. 1991.
The Richochet Wireless Network Overview, retrieved from http://www.ricochet.net/ricochet/, 1997.
"Virtual LAN Communications," Cisco VLAN Roadmap—White Paper, Dec. 9, 1996.
"Virtual LANs Find a Use for Selective Flooding," Network World, Apr. 10, 1995, V.12, No. 15, p. 54.
"Virtual LANs Get Real," Data Communications, Feb. 1995, pp. 87-96.
"Virtual LANs Near Reality," Data Communications, Jul. 1995, p. 16.
"VisualRoute—Visual Traceroute Utility/Locate Internet Abusers," retrieved from www.visualware.com/visualroute/index/html, Jul. 2002.
Aggarwal, Sudhir, and Raghav, Amritansh, "Dualcast: A Scheme for Reliable Multicasting," IEEE, Apr. 1994, pp. 15-22.
Aguilar, Lorenzo, "Datagram Routing for Internet Multicasting," ACM, 1994, pp. 58-63.
Ahmadi, Hamid, and Denzel, Wolfgang E., "A Survey of Modern High-Performance Switching Techniques," IEEE Journal on Selected Areas in Communications, V.7, No. 7, Sep. 1989, pp. 1091-1103.
Aiello, Rosario, et al., "Casual Ordering in Reliable Group Communications," ACM SIGCOMM, 1993, pp. 106-115.
Almquist, P., and Kastenholz, F., "Towards Requirements for IP Routers," Network Working Group RFC 1716 Memo, Nov. 1994, pp. 1-172.

Alonge, Ken, "Revision to SDE," Email dated Nov. 13, 1995.
Amir and Balakrishnan, "An Evaluation of the Metricom Richochet Wireless Network," U.C. Berkeley, May 1996.
Ammar, Mostafa H., "Probabilistic Multicast: Generalizing the Multicast Paradigm to Improve Scalability," College of Computing, Georgia Institute of Technology, Atlanta, GA, pp. 1-9.
Anderson, Jens Kristian, "Virtual LANs Take Network to Next Level," Computer Technology Review, Sep. 1996, pp. 12-14.
Armstrong, S., et al., "Multicast Transport Protocol," Network Working Group—RFC 1301 Memo, Feb. 1992, pp. 1-36.
Auerbach, Josh, et al., "Multicast Group Membership Management in High Speed Wide Area Networks,".
Autolitano, A., et al., "Application of Generalized Parallel Delta Networks to a Hybrid Broadband Switch," IEEE 1989, pp. 123-127.
Axner, David H., "Differing Approaches to Virtual LANs," Business Communications Review, V. 23, No. 12, Dec. 1993, pp. 42-45.
Backes, Floyd, "An Architectural Framework for VLAN Standardization in IEEE 802," IEEE Presentation, Milpitas, CA, Jan. 24, 1996.
Backes, Floyd, "Spanning Tree Bridges; Transparent Bridges for Interconnection of IEEE 802 LANs," IEEE Network, V.2, No. 1, Jan. 1988, pp. 5-9.
Bagwell, Richard T., et al., "A Comparison of Native ATM-Multicast to IP-Multicast With Emphasis on Mapping Between the Two," IEEE, 1995, pp. 189-193.
Bahl and Padmanabhan, "RADAR: An In-Building RF-based User Location and Tracking System," Proc. IEE Infocom 2000, Mar. 2000.
Bahl, Padmanabhan, and Balachandran, "A Software System for Locating Mobile Users: Design, Evaluation, and Lessons," Apr. 2000.
Bahl, Padmanabhan, and Balachandran, "Enhancements to the RADAR User Location and Tracking System," Microsoft Research Technical Report, MSR-TR-2000-12, Feb. 2000.
Balboni, Gian Paolo, et al., "An ATM Switching Testbed," Jul.-Aug. 1991.
Ballardie, Tony, et al., "Multicast-Specific Security Threats and Counter Measures," IEEE 1995, pp. 2-16.
Ballardie, Tony, et al., "Core Based Trees (CBT)—An Architecture for Scalable Inter-Domain Multicast Routing," ACM SIGCOMM, 1993, pp. 85-95.
Bament, Sally, "Why You Should Consider INPs as a Viable Internetworking Solution," Telecommunications, V.27, No. 2, Feb. 1993, pp. 54-57.
Bartlett, John, "Embedded VLAN Tagging," IEEE 802.1 Meeting Presentation, LaJolla, CA, Mar. 12, 1996.
Bartlett, John, "Media or Network Based VLANs?," IEEE 802.1 VLAN Meeting Presentation, LaJolla, CA, Mar. 12, 1996.
Barton and Kindberg, "The Challenges and Opportunities of Integrating the Physical World and Networked Systems," Hewlett Packard Laboratories, HPL-2001-18, Jan. 24, 2001.
Bennett, Geoff, "Routing in the Virtual LAN," Telecommunications, V. 29, No. 7, Jul. 1995, pp. 33, 69-72.
Bernabei, Francisco, et al., "A Fully Distributed Routing Control Scheme in an ATM Switch," IEEE, 1990, pp. 766-770.
Bichard, Jean Philippe, "Decouper le Reseau en Segments Autonomes".
Birman, Ken, "A Response to Cheriton's and Skeen's Criticism of Causal and Totally Ordered Communication," Department of Computer Science, Cornell University, Oct. 21, 1993, pp. 11-21.
Birman, Kenneth P., and Joseph, Thomas A., "Reliable Communication in the Presence of Failures," ACM Transactions on Computer Systems, V.5, No. 1, Feb. 1987, pp. 47-76.
Birman, Kenneth, et al., "Design Alternatives for Process Group Membership and Multicast," NTIS, Department of Computer Science—Cornell University, Dec. 1991, pp. 1-31.
Blazevic et al., "Self-Organization in Mobile Ad-Hoc Networks: The Approach of Terminodes," IEEE Comm. Mag. 2001.
Boggs, David Reed, "Internet Broadcasting," Dissertation—Stanford University Graduate Studies, University Microfilms International, Jan. 1982, pp. 1-86.
Bolot, Jean-Chrysostome, et al. "Scalable Feedback Control for Multicast Video Distribution in the Internet," ACM SIGCOMM, 1994, pp. 58-67.
Braden, R., "TCP Extensions for High Performance: An Update," Jun. 21, 1993.
Braden, R., and Postel, J., "RFC 1009—Requirements for Internet Gateways," Jun. 1987, pp. 1-55.
Braden, Robert, "Requirements for Internet Hosts—Communication Layers," Internet Engineering Task Force—RFC 1122, Oct. 1989, pp. 1-115.
Brakmo et al., "Performance Problems in BSD4.4 TCP", Dept. of Computer Science, University of Arizona, Tucson, AZ.
Brakmo et al., "TCP Vegas: End to End Congestion Avoidance on a Global Internet," Dept. of Computer Science, University of Arizona, Tucson, AZ.
Brakmo et al., "TCP Vegas: New Technologies for Congestion Detection and Avoidance," Dept. of Computer Science, University of Arizona, Tucson, AZ, 1996.
Braudes, R., and Zabele, S., "Requirements for Multicast Protocols," Network Working Group RFC 1458 Memo, May 1993, pp. 1-18.
Bulusu, Heidermann and Estrin, "GPS-less Low Cost Outdoor Localization for Very Small Devices," Univ. S. California, Apr. 2000.
Bunn, J.J., "Trip Report: DECworld," unpublished, May 18, 1992, pp. 1-11.
Caffery and Stuber, "Overview of Radiolocation in CDMA Cellular Systems," IEEE Communications Magazine, Apr. 1998, pp. 38-45.
Caffery and Stuber, "Subscriber Location in CDMA Cellular Networks," IEEE Trans Veh. Tech. vol. 47, May 1997.
Casner, Stephen, and Deering, Stephen, "First IEFT Internet Audiocast," ACM SIGCOMM—Computer Communication Review, pp. 92-97.
Casner, Steve, "Frequently Asked Questions (FAQ) on the Multicast Backbone (MBONE)," Memo dated Dec. 22, 1994.
Catlin, Jeff, "VLAN," Email dated Nov. 22, 1995.
Challenges for Mesh Networks in UWB Applications, UWB Insider 2004 [retrieved Dec. 1, 2006] from the Internet: <URL: www.uwbinsider.com/technology/print/1_8_mesh_challenges.html>.
Chambers, Alan M. "IP multicast, Floyd Backes's Presentation, Denver," Email dated Nov. 1, 1995.
Chambers, Alan M. "Re: VLAN Ad Hoc Group," Email dated Jun. 14, 1995.
Chambers, Alan, "Mapping the Problem Space," Jul. 9, 1996.
Chan, Cheung-Win, and Yum, Tak-Shing, "An Algorithm for Detecting and Resolving Store-and-Forward Deadlocks in Packet-Switched Networks," IEEE Transactions on Communications, V.Com-35, No. 8, Aug. 1987, pp. 801-807.
Chen and Lin, "Route Optimization and Location Updates for Mobile Hosts," 16th IEEE Int. Conf. on Dist. Comp. Sys., May 1996.
Chen, Helen, et al., "Evaluation of DEC's Gigaswitch for Distributed Parallel Computing," Supersedes-SAND93-8013, Oct. 1993.
Chen, Xing, and Hayes, Jeremiah F., "Access Control in Multicast Packet Switching," IEEE/ACM Transactions on Networking, V.1, No. 6, Dec. 1993, pp. 638-649.
Cheriton, David R. "Virtual LAN Management Protocol (VLMP) Draft RFC," Stanford University and Granite Systems, Inc., Oct. 20, 1995.
Cheriton, David R., and Deering, Stephen E., "Host Groups: A Multicast Extension for Datagram Internetworks," Proceedings Ninth Data Computer Symposium, Sep. 10-13, 1985, pp. 172-179.
Cheriton, David R., and Williamson, Carey L., "VMTP as the Transport Layer for High-Performance Distributed Systems," IEEE Communications Magazine, Jun. 1989, pp. 37-44.
Cheriton, David R., and Zwaenepoel, Willy, "Distributed Process Groups in the V Kernel," ACM Transactions on Computer Systems, V.3, No. 2, May 1985, pp. 77-107.
Cheriton, David R., et al., "Ethernet Group Membership Protocol (EGMP) Draft RFC," Stanford Univeristy and Granite Systems, Oct. 12, 1995.
Cisco 7100 Series VPN Router, Cisco Systems, Inc.
Cisco VPN Routers, Cisco Systems, Inc. (1992-20001).
Cisco VPN Solutions, Cisco Systems, Inc. (2001).
Cohen, Jodi, "Critics Take Issue With Fuzzy VLAN Standards Work," Network World, Oct. 30, 1995, V.12, No. 44, pp. 1, 84.
Cohen, Jodi, "Opposing Virtual LAN Views," Network World, Oct. 28, 1996, V.13, No. 44, p. 75.

Cohen, Jodi, "The Truth About Virtual LANs," Network World, Oct. 28, 1996, V.13, No. 44, pp. 1,74.
Cohen, Jodi, "Too Small for VLANs," Network World, Nov. 4, 1996, V.13, No. 45, p. 31.
Conner, Krishnamurthy and Want, "Making Everyday Life Easier Using Dense Sensor Networks," Springer, 2001.
Connery, Glenn, "Re: VLAN Questions/Suggestions," Email dated May 6, 1996.
Corson and Macker, "Mobile As hoc Networking (MANET): Routing Protocal Performance Issues and Evaluation Considerations," Jan. 1999.
Crowcoft, John, "Talking of and to Gateways and Bridges," Email thread.
Cullerot, David, "Requirements for VLANs," 802.1 Interim Meeting, Oct. 1995, Cabletron Systems, Inc.
Cullerot, David, "Virtual LAN Topology," 802.1 Interim Meeting, Oct. 13, 1995, Cabletron Systems, Inc.
Cullerot, David, "VLAN Topology", 802.1 Interim Meeting, Oct. 13, 1995, Cabletron Systems, Inc.
Daviel, Internet Draft entitled, "Geographic Extensions for HTTP transactions," Apr. 2001.
Davis et al., "A Means for Expressing Location Information in the Domain Name System," Jan. 1996.
De Zhong, Wen, et al., "A Copy Network with Shared Buffers for Large-Scale Multicast ATM Switching," IEEE/ACM Transactions on Networking, V.1, No. 2, Apr. 1993, pp. 157-165.
Deering, S., "RFC 1112—Host Extensions for IP Multicasting," Aug. 1989.
Deering, S., and Hinden, R., "RFC 2460—Internet Protocol, Version 6 (IPv6) Specification," RFC Archive, Dec. 1998 pp. 1-40.
Deering, S.E., "Host Extensions for IP Multicasting," Network Working Group—RFC 988 Memo, Jul. 1986, pp. 1-20.
Deering, Stephen E., "Multicast Routing in Internetworks and Extended LANs," SIGCOMM 88 Symposium, Communications, Architectures & Protocols, Stanford, CA, Aug. 16-19, 1988, pp. 55-64.
Deering, Stephen E., and Cheriton, David R., "Multicast Routing in Datagram Internetworks and Extended LANs," ACM Transactions on Computer Systems, V.8, No. 2, May 1990, pp. 85-110.
Deering, Stephen Edward, "Multicast Routing in a Datagram Internetwork," UMI Dissertation Services, Dec. 1991, pp. 1-137.
Deering, Stephen, et al., "An Architecture for Wide-Area Multicast Routing," ACM, Apr. 1994, pp. 126-134.
Deering, Steve, et al., "Efficient Support for Sparse-Group Multicast Routing," Slides from Presentation by Deborah Estrin.
Denning et al. "Location-Based Authentication: Grounding Cyberspace for Better Security," 1996, Elsevier Science Ltd., pp. 1-6.
Derby, et al., "Scoping Multicasts in WAN Interconnected Local Networks," IBM Technical Disclosure Bulletin, Jan. 1992.
Drane, Macnaughton, and Scott, "Positioning GSM Telephones," IEEE Communications Magazine, Apr. 1998.
Duffy, Jim, "Routers' Role Changes as Both Switches, VLANs Come Into Play," Network World, Jun. 3, 1996, V.13, No. 23, p. 22.
Eriksson, Hans, "MBONE: The Multicast Backbone," Communications of the ACM, V.37, No. 8, Aug. 1994, pp. 54-60.
Erramilli, A., and Singh, R.P., "A Reliable and Efficient Multicast Protocol for Broadband Broadcast Networks," ACM, 1988, pp. 343-353.
Estrin, Deborah, and Wei, Liming, "Multicast Routing in Dense and Sparse Modes: Simulation Study of Tradeoffs and Dynamics," IEEE, Jul. 1995, pp. 150-157.
Fall et al., "Comparison of Tahoe, Reno, and Sack TCP," Lawrence Berkeley National Laboratory, Berkeley, CA, Dec. 2, 1995.
Feldmann, et al., "NetScope: Traffic Engineering for IP Networks," IEEE Network Mag. 2000.
Feltman, Charles, "A Reality Check on Virtual LANs," Business Communications Review, V.26, No. 7, Jul. 1996, p. 27.
Finn, Norman W., "External and Internal Addresses in Explicit Tags," Email dated Jan. 25, 1996.
Finn, Norman W., "Implicit vs. Explicit VLAN Frame Tagging," Email dated Jan. 25, 1996.
Finn, Norman W., "Re: 802.1 Interim Meeting—VLANs—Objectives, Contributions, Agenda," Email dated May 17, 1996.
Finn, Norman W., "Re: VLAN Questions/Suggestions," Email dated May 8, 1996.
Finn, Norman W., "Re: VLANs and IP Multicast," Email dated May 9, 1996.
Finn, Norman W., "Slides for External and Internal Addresses in Explicit Tags," Email dated Jan. 25, 1996.
Finn, Norman W., "Slides for Implicit vs. Explicit VLAN Frame Tagging," Email dated Jan. 25, 1996.
Finn, Norman W., "Two Models for VLAN Tagging," Email dated Mar. 8, 1996.
Finn, Norman, "Multiple Spanning Trees in 802.1Q," IEEE 802.1 Presentation, Sep. 26, 1996, pp. 1-11.
Floyd et al., "Increasing TCP's Initial Window," Jul. 1997.
Floyd, S., "Issues of TCP with SACK," Mar. 9, 1996.
Floyd, S., "TCP and Successive Fast Retransmits," Lawrence Berkeley Laboratory, Berkeley, CA May 1995.
Frantz, Paul, "Re: Re: Revision to SDE," Email dated Nov. 24, 1995.
Frantz, Paul, et al., "Proposed VLAN Service Definition," IEEE 802.1 Presentation, Denver, Oct. 13, 1995.
Gabber and Wool, "On Location-Restricted Services," IEEE Network, Nov./Dec. 1999.
Garcia-Molina, Hector, and Spauster, Annemarie, "Ordered and Reliable Multicast Communication," ACM Transactions on Computer Systems, V.9, No. 3, Aug. 1991, pp. 242-271.
Gessler and Jesse, "Advanced Location Modeling to Enable Sophisticated LBS Provisioning in 3G Networks," retrieved from www.teco.edu/locationws/9.pdf, Jul. 2002.
Gong, Li, and Shacham, Nachum, "Elements of Trusted Multicasting," IEEE, Apr. 1994, pp. 23-30.
GOPAL, INDER, and ROM, RAPHI, "Multicasting to Multiple Groups over Broadcast Channels," IEEE, 1988, pp. 79-81.
Greenfield, David, "A Realistic Approach to Virtual LANs," Data Communications, Feb. 1996, V.25, No. 2, pp. 50, 52.
Hain, T., Internet Drafts entitled "An IPv6 Provider-Independent Global Unicast Address Format," and "Application and Use of the IPv6 Provider Independent Global Unicast Format," Oct. 2001.
Hanks, S., "Generic Routing Encapsulation (GRE)," Oct. 1994.
Harris & Jeffries, Inc., "A Proposal for Software Development—for an IP-Router Facility," Proposal # 910214.01, Feb. 19, 1991.
Harris, B., "Amulet: Approximate Mobile User Location Tracking System," Retrieved from www.winlab.rutgers.edu/~sachin/papers/papers.html, Jul. 2002.
Hart, John and Backes, Floyd, "IEEE 802 Virtual LANs (VLANs), Proposed Definition and Requirements," dated Jul. 10, 1995.
Hart, John, "Re: Re: Revision to SDE," Email dated Nov. 25, 1995.
Hausman, Richard and Ruby, Doug, "Application Requirements for Support of Duplicate Addresses in VLANs," Contribution to IEEE 802.1Q, Vancouver Plenary, Nov. 11, 1996.
Hausman, Richard, "Re: 802.1Q VLAN PAR Backwards Interoperability," Email dated Jun. 24, 1996.
Hawe, Bill, et al., "Transparent Interconnection of Local Area Networks with Bridges," Journal of Telecommunication Networks, V.3, No. 2, pp. 139-152 .
Heidemann, J., "Using Geospatial Information in Sensor Networks," USC/Information Sciences Institute, Sep. 17, 2001.
Heywood, Drew, et al., "Enterprise Series Connectivity: Local Area Networks," 1992, pp. 327-353.
Hightower and Borriello, "A Survey and Taxonomy of Location Systems for Ubiquitous Computing," University of Washington Technical Report, UW-CSE Jan. 8, 2003, Aug. 24, 2001.
Hightower, Borriello, and Want, "SpotON: An indoor 3D Location Sensing Technology Based on RF Signal Strength," University of Wisconsin CSE Technical Report #2000-02-02, Feb. 18, 2000.
Horowitz, Steve, "Priority Bits & First on the Wire Question," Email dated Jun. 25, 1996.
Horowitz, Steve, "Priority Bits Discussion," Email dated Jun. 7, 1996.
Horowitz, Steve, "VLAN Issues List," Email dated Jun. 7, 1996.
Housley, Russ, "Use of SDE to within VLAN Standard," Email dated Jan. 23, 1996.
Huat, Ong Sion, and Hiong, Goh Seow, "A Generic Multicast-Key Determination Protocol," Defence Science Organization, Singapore. Ideal Congestion Control, Sep. 1997.

Imielinski and Navas, "GPS-Based Addressing and Routing," Nov. 1996.
Interior Gateway Routing Protocol, Cisco Systems, Inc. (1999).
International Search Report and Written Opinion from PCT/US05/06503.
IP Sec, Cisco Systems, Inc. (1998).
Jacobson, V., "Design Changes to the Kernel Network Architecture for 4.4BSD," Lawrence Berkeley Laboratory, Berkeley, CA May 1992.
Jacobson, V., "Dynamic Congestion Avoidance/Control," email message, Feb. 1988.
Jacobson, V., "End2End," email message, Mar. 1994.
Jacobson, V., "Modified TCP Congestion Avoidance Algorith," email message, Apr. 1990.
Jacobson, V., "Re: Interpacket arrival variance and mean," email message, Jun. 15, 1987.
Jacobson, V., "Re: your congestion scheme," email message, Nov. 1987.
Jacobson, V., "Some Design Issues for High-Speed Networks," Lawrence Berkeley Laboratory, Berkeley, CA Nov. 1993.
Jacobson, V., "TCP Extensions for High Performance," email message, Feb. 1997.
Jacobson, V., "TCP Extensions for Long-Delay Paths," Oct. 1988.
Jeffree, Tony, "Brief Minutes of 802.1—Maui, Jul. 1995," IEEE 802.1 Maui, Jul. 1995.
Jeffree, Tony, "Input paper for July Meeting—Proposed changes to 802.1D Section 3," Email dated Jun. 22, 1995.
Jeffree, Tony, "Proposed Use of GARP for Distribution of VLAN Membership Information," Oct. 28, 1996.
Jeffree, Tony, "Re: Re: Revision to SDE," Email dated Nov. 24, 1995.
Jeffree, Tony, "Re: VLAN Questions/Suggestions," Email dated May 7, 1996.
Jia, Xiaohua, and So, Shirley Y., "A Multicast Mechanism with Ordering on Overlapping Groups," IEEE, 1993, pp. 242-249.
Jing, Hsu Wen, "Multicasting on Certain Self-Similar Networks," Division of Computer Technology—School of Applied Science—Nanyang Technological University, Singapore.
Joe Francica, "Location-based Services: Where Wireless Meets GIS," retrieved from www.geoplace.com, Jul. 2002.
Karagiannis and Heijeck, "Mobile IP: A State of the Art Report," Ericsson Open Report, Jul. 13, 1999.
Keen, Hal, "Comment on P802.1p/D0," Email dated Oct. 30, 1995.
Kindberg and Barton, "The Cooltown User Experience," Hewlett Packard Laboratories, HPL-2001-22, Feb. 2, 2001.
King, Steven S., "Its an Adventure," Network World, Apr. 10, 1995, pp. 49, 54-55.
King, Steven S., "Switched Virtual Networks—Internetworking Moves Beyond Bridges and Routers," Data Communications, Sep. 1994, pp. 66-80.
King, Steven S., "VLANS Raise Delicate Design Issues," Network World, Apr. 17, 1995, V.12, No. 16, pp. 42-43.
King, Steven, "The Many Faces of Virtual LANs," Network World, Mar. 27, 1995, V.12, No. 13, pp. 59-65.
Klamm, Keith, "Dancing Bears in Readable Text Format," Email dated Mar. 8, 1996.
Knight, Fred S., "Broadband Future Faces Snarls and Gnarls," Business Communications Review, V. 23, No. 12, Dec. 1993, p. 6.
Kompella, Vachaspathi, et al., "Multicast Routing for Multimedia Communication," IEEE/ACM Transactions on Networking, V.1, No. 3, Jun. 1993, pp. 286-292.
Kompella, Vachaspathi, et al., "Multicasting for Multimedia Applications," Department of Computer Science and Engineering—University of CA, San Diego.
Korkea-Aho and Tang, Internet Drraft (May 2001) entitled "Spactial Location Payload," May 2001.
Langille, Paul, "Partitioning of VLAN Tasks," Email dated Nov. 16, 1995.
Langille, Paul, "Re: Revision to SDE," Email dated Nov. 22, 1995.
Langille, Paul, "Re: . . . Re: Revision to SDE," Email dated Nov. 29, 1995.
Lawson, Stephen, "3Com Unveils a Single Solution for Virtual LANs," InfoWorld, May 13, 1996, V.18, No. 20, p. 59.
Lawson, Stephen, "Cabletron Buys Netlink to Fill Out Frame Relay," InfoWorld, Oct. 7, 1996, V.18, No. 41, p. 51.
Lewis, Bob, "Do VLANs Solve Any Real Problems? Lots of People Seem to Think So," InfoWorld, Jun. 17, 1996, V.18, No. 25, p. 91.
Li et al, "A Scalable Location Service for Geographic Ad Hoc Routing," Proceedings of the ACM MOBICOM 2000 Conference.
Liao, Tseng, and Sheu, "Grid: A Fully Location-Aware Routing Protocol for Mobile As Hoc Networks," Telecommunications Systesm, 2001.
Lidinske, Bill, "802.1 Minutes and Document Plan," Mar. 8, 1995.
Lidinsky, Bill "Re: VLAN Ad Hoc Group," Email dated Jun. 12, 1995.
Lidinsky, Bill, "802.1Q Draft PAR," Email dated Dec. 19, 1995.
Lidinsky, Bill, "8021. Interim Mtg VLAN Agenda," Email dated Oct. 1995.
Lidinsky, Bill "IEEE 802 Overall Agenda—Jul. 1996," Email dated Jun. 23, 1996.
Lidinsky, Bill, "Re: 802.?q," Email dated Jun. 21, 1996.
Lidinsky, Bill, "Re: VLAN use of SDE," Email dated Oct. 2, 1995.
Lidinsky, Bill "VLAN use of SDE," Email dated Oct. 1, 1995.
Lindmeyr, Johann, "VLAN Tagging and Classification," Email dated Nov. 30, 1995.
Lippis, Nick, "Virtual LANs: Real Drawbacks," Data Communications, Dec. 1994, pp. 23-24.
MacLeod, Brian, "1Gbps Ethernet" Email dated Oct. 9, 1995.
Marasli et al., "Partially Reliable Transport Service," Proceedings 2nd IEEE Symp. On Comp. and Comm. (Cat. No. 97TB100137), Proceedings Second IEEE Symposium on Computer and Commmunications, Alexandria, Egypt, Jul. 1-3, 1997, pp. 648-656, XP002131820.
Marasli et al., "Retransmission-Based Partially Reliable Transport Service: An Analytic Model," Proceedings of Infocom, US, Los Alamitos, IEEE Comp. Soc. Press, Vol. Conf. 15, 1996, pp. 621-629, XP000621327 (ISBN: 0/8186-7293-5).
Markowsky, George, and Moss, Franklin H., "An Evaluation of Local Path ID Swapping in Computer Networks," IEEE Transactions on Communications, V.Com-29, No. 3, Mar. 1981, pp. 329-336.
Martillo, Joachim, "Re: InterOp Debate," Email thread dated Nov. 6, 1991.
Martillo, Joachim, "Using Wide-Area Point-to-Point Links for Computer Networking," Email thread dated Sep. 1, 1991.
Martillo, Yakim, "Re: Ethernet Multicast," Archived Emails.
Mathis et al., "Forward Acknowledgement: Refining TCP Congestion Control," Pittsburgh Supercomputing Center.
Mathis et al., "TCP Rate-Halving with Bounding Parameters," Pittsburgh Supercomputing Center, Oct. 1996.
Mathis et al., "TCP Selective Acknowledgement options," email message, Oct. 1996.
Mauve and Widmer, "A survey on Position-Based Routing in Mobile Ad Hoc Networks," IEEE Network, Nov./Dec. 2001.
Mayer, Erwin, "An Evaluation Framework for Multicast Ordering Protocols," ACM, 1992, pp. 177-187.
McCarthy, Vance, "Fast Ethernet and VLANs," Datamation, Apr. 1, 1996, V.42, No. 7, p. 13.
McConnell, John, "VLANs Are Here to Stay," Network World, Jul. 1, 1996, p. 37.
McGeough, J., "Location-Based Services and Topology," Jul. 26, 2001.
McGeough, J., "Wireless Location Positioning From Existing Signal Level Data," Dec. 12, 2001.
McGibbon, Alex, "Virtual LANs Come of Age," Telecommunications, Jun. 1996, pp. 48-52.
McKeown, Nick, et al., "The Bay Bridge: A High Speed Bridge/Router," Protocols for High-Speed Networks, III (C-9), 1992, pp. 203-218.
McKinley, Philip, and Liu, Jane W.S., "Multicast Routing in Bus-Based Computer Networks," IEEE, 1988, pp. 277-287.
McNealis, Martin, "Re: Revision to SDE," Email dated Nov. 17, 1995.
McNealis, Martin, "Virtual LAN Requirements," Cisco Systems, IEEE 802.1 Interim, Oct. 12, 1995.
Merhar, Milan, "Priority Bits Discussion," Email dated Jun. 7, 1996.

Merhar, Milan, "VLAN Questions/Suggestions," Email dated May 7, 1996.
Merhar, Milan, "VLANs and IP Multicast," Email dated May 9, 1996.
Messier, Fattouche and Peterson, "Locating an IS-95 Mobile Using its Signal," Conf. Rec. The Tenth International Conference on Wireless Communications (Wireless 98). volll, (Calgary, AB, Canada), pp. 562-574.
Meyer, G., "The PPP Encryption Control Protocol (ECP)," Spider Systems, email message, Jun. 1996.
Miller, Ken, "Broadcast News: Multicasting the WAN," Data Communications, V.24, No. 3, Mar. 1995, pp. 25-26.
MMCNEALIS@CISCO.COM, "1995-The year of the Virtual LAN," IEEE Conference Presentation, Maui, Jul. 1995.
Momirov, Milan, "VLANs and IP Multicast," Email dated May 9, 1996.
Moore, Periakaruppan, and Donohoe, "Where in the World is netgeo.caida.org?" Proc. Internet Soc. Con. (INET), 2000.
Moore, Steve, "Virtual LAN Explainer," Computerworld, Jun. 13, 1994, V.28, No. 24, p. 85.
Morency, John and Winkler, Kathrin, "VLANs: Can Layer 3 Save the Day?," Business Communications Review, pp. 47-50.
Moy, John, "MOSPF: Bringing Multicast to Commercial TCP/IP Nets," Network World, V.11, No. 25, Jun. 20, 1994, pp. 11,20.
Moy, John, "Multicast Routing Extensions for OSPF," Communications of the ACM, V.37, No. 8, Aug. 1994, pp. 61-66.
Network Working Group Request for Comments: 1072, "TCP Extensions for long-Delay Paths," Sep. 1997.
Ngoh, L.H., "Multicast Support for Group Communications," Computer Networks and ISDN Systems, 1991, pp. 165-178.
Ngoh, L.H., and Hopkins, T.P., "Transport Protocol Requirements for Distributed Multimedia Information Systems," The Computer Journal, V.32, No. 3, 1989, pp. 252-261.
Niculescu and Nath, "Adhoc Positioning System (APS)," in IEEE GlobeCom, Nov. 2001.
Ofek, Yoram, "Multicast and Semi-FIFO Protocols over Virtual Rings in the MetaNet," IBM T.J. Watson Research Center, Yorktown Heights, NY.
Olsen, Bob, "Up Close: Populating a Virtual LAN," Network World, Oct. 30, 1995, V.12, No. 44, p. 49.
Open Shortest Path First, Inernetworking Technology Overview (1999).
Padmanabhan and Subramanian, "An Investigation of Geographic Mapping Techniques for Internet Hosts," SIGCOMM '01, Aug. 27-31, 2001, San Diego, CA.
Padmanabhan and Subramanian, "Determining the Geographic Locations of Internet Hosts," in Proc. ACM SIGCOMM, Aug. 2001.
Pahlavan and Li, "Indoor Geolocation Science and Technology," IEEE Comminications Magazine, Feb. 2002.
Partridge et al., "A Faster UDP," IEEE/ACM Trans. on Networking, Aug. 1993.
Pasquale, Joseph C., et al., "The Multimedia Multicast Channel," Department of Computer Science and Engineering, University of CA, San Diego.
Passmore, David and Freeman, John, "The Virtual LAN Technology Report", Decisys, Inc., May 1996.
Pattavina, Achille, "Design and Performance Evaluation of a Packet Switch for Broadband Central Offices," INFOCOM Dept., University "La Sapienza", Rome, Italy, 1990, pp. 1252-1259.
Paul, Sanjoy, et al., "Multicast Transport Protocols for High Speed Networks," IEEE Apr. 1994, pp. 4-14.
Perlman, Radia, "An Algorithm for Distributed Computation of a Spanning Tree in an Extended LAN," Proceedings—Ninth Data Communications Symposium, Whistler Mountain, British Columbia, Sep. 10-13, 1985.
Perry, Yonadev, "Re: Re: Re: Revision to SDE," Email dated Nov. 27, 1995.
Perry, Yonadev, "Re: Revision to SDE," Email dated Nov. 26, 1995.
Petrosky, Mary, "HUB Shopping Spree," Network World, May 29, 1995.
Polk and Tang, "Spactial Location Server Authentication," Internet Draft (Mar. 2000).
Postel, J. and Reynolds, J., "A Standard for the Transmission of IP Datagrams Over IEEE 802 Networks," Network Working Group—RFC 1042 Memo, Feb. 1988, pp. 1-15.
Priyantha, N., "Providing Precise Indoor Location Information to Mobile Devices," Master's thesis, Massachusetts Institute of Technology, Jan. 2001.
Rajagopalan, Bala, "Reliability and Scaling Issues in Multicast Communication," Computer Communication Review, SIGCOMM 1992 Conference Proceedings, Baltimore, MD, Aug. 17-20, pp. 188-198.
Rand, D., "The PPP Compression Control Protocol (CCP)," Novell, email message, Jun. 1996.
Rijsinghani, Anil, "minutes from day 3 of Interim 802.1 meeting," Email dated Oct. 19, 1995.
Rijsinghani, Anil, "Re: 802.1Q VLAN PAR Backwards Interoperability (802.5/FDDI Coding Issue)," Email dated Jun. 13, 1996.
Rijsinghani, Anil, "Re: VLAN Progress, Tagging, SDE etc.—Just Hold It Please," Email dated Nov. 24, 1995.
Rios, S., "Location Based Services: Interfacing to a Mobile Positioning Center," retrieved from www.wirelessdevnet.com/channels/lbs/features/lbsinterfacing.html, Jun. 2002.
Rivers, Jr, "Re: VLAN Questions/Suggestions," Email dated May 6, 1996.
Rizzo, L., "Issues in the implementation of selective acknoledgements for TCP," email message, Jan. 1996.
Rooney, Sean, et al., "Automatic VLAN Creation Based on On-line Measurement," Computer Communication Review, pp. 50-57.
Salwen, Howard et al., "Examination of the Applicability of Router and Bridging Techniques," IEEE Network, V.2, No. 1, Jan. 1988, pp. 77-80.
Saunders, Stephen, "Building Virtual LANs on a Real-World Budget," Data Communications, Sep. 21, 1995, pp. 39-40.
Saunders, Stephen, "Making Virtual LANs a Virtual Snap," Data Communications, Jan. 1995, pp. 72-74.
Saunders, Stephen, "Matrix-Based Switching Revs Up the LAN," Data Communications, Mar. 21, 1994, pp. 35-36.
Saunders, Stephen, "Switch Puts Virtual LANs on Automatic Pilot," Data Communications, Sep. 1994, pp. 45-46.
Sayed, Ayman, "Re: Revision to SDE," Email dated Nov. 22, 1995.
Seaman, Mark, "For 802.0—Proposed 802.1 PAR," Email dated May 26, 1995.
Seaman, Mark, "Re: IEEE Plenary—VLANs—802.1 Meeting" Email dated Jul. 4, 1995.
Seaman, Mick, "[Mark Sankey/US/3Com: Gigabit Enet and VLAN]," Email dated Apr. 13, 1996.
Seaman, Mick, "802.1 Interim Meeting—VLANs—Objectives, Contributions, Agenda," Email dated May 3, 1996.
Seaman, Mick, "802.1 Interim on VLANs: Discussion of Requirements," Email dated Oct. 25, 1995.
Seaman, Mick, "802.1 VLAN Interim Meeting—Reminder and Initial Agenda," Email dated Jan. 22, 1996.
Seaman, Mick, "VLAN Progress, Tagging, SDE etc.—Just Hold It Please," Email dated Nov. 22, 1995.
Seamen, Mick, "Foil for Discussion, IEEE 802.1 Closing Plenary," IEEE 802.1 Meeting, Jul. 11, 1996.
Seamn, Mick, "802.1 Agenda, Denver Interim Meeting (VLANs, etc.)," Email dated Jul. 28, 1995.
Seifert, Rich, "Re: Type Field Values," Email dated May 29, 1996.
Seifert, William M., "Bridges and Routers," IEEE Network, V. 2, No. 1, Jan. 1988, pp. 57-64.
Seifert, William M., "Bridges and Routers," IEEE Network, V.2, No. 1, Jan. 1988, pp. 57-64.
Sellers, Philip, "Cabletron Gambling on Virtual LANS," Computing Canada, Apr. 25, 1996, V.22, No. 9, p. 27.
Shah, Himanshu, "Re: 802.1Q VLAN PAR Backwards Interoperability (802.5/FDDI Coding Issue)," Email dated Jun. 14, 1996.
Shah, Himanshu, "Re: Re: Revision to SDE," Email.
Sharma et al., "Scalable Timers for Soft State Protocols," Information Sciences Institute, University of Southern California.
Shimada, K. Karl, "VLAN Classes," IEEE 802.1 Interim Meeting Presentation, Denver CO, Oct. 11-13, 1995, Rising Star Research.
Shimada, K. Karl, "VLAN Definition," IEEE 802.1 Interim Meeting Presentation, Denver CO, Oct. 11-13, 1995, Rising Star Research.

Shimada, K. Karl, "VLAN Requirements," IEEE 802.1 Interim Meeting Presentation, Denver CO, Oct. 11-13, 1995, Rising Star Research.
Shimada, Karl K. "802.1 Interim meeting," Email dated Aug. 22, 1995.
Simpson, W., "The Point-to-Point Protocol (PPP)," Daydreamer, Jul. 1994.
Sincoskie, David W., and Cotton, Charles J., "Extended Bridge Algorithms for Large Networks," IEEE Network, V.2, No. 1, Jan. 1988, pp. 16-24.
Slager, "IEEE 802.1 Opening Plenary Minutes," IEEE 802.1 Meeting, University of Twente, Enschede, Netherlands, Jul. 8, 1996.
Slager, R.V., "Email Voting Ballot: P802.1j/D5: Managed Objects for MAC Bridges—Supplement to IEEE Std. 802.1d", IEEE, Aug. 2, 1995.
Slager, Rosemary V., "IEEE 802.1 (unofficial) VLAN Meeting Minutes," IEEE 802.1 Milpitas, CA, Jan. 24, 25, 1996.
Slager, Rosemary, "802.1 Interim Meeting Minutes," 802.1 Interim Meeting, Wakefield, MA, Jun. 1996.
Slager, Rosemary, "IEEE 802.1 Interim Meeting Minutes," IEEE 802.1 Meeting, Ottawa, Canada, Oct. 2, 1996 through Oct. 4, 1996.
Slager, Rosemary, "June96 Resolutions," Email dated Jun. 7, 1996.
Slager, Rosemary, "Proposed Minutes," Email dated Jun. 19, 1996.
Slofstra, Martin, "Cisco Unveils Multimedia 'Blueprint'," Computing Canada, V.21, No. 7, Mar. 29, 1995, p. 21.
Small, Smailagic and Siewiorek, "Determining User Location for Contect Aware Computing Through the Use of a Wireless LAN Infrastructure," retrieved from http://www.cs.cmu.edu/laura/docdir/small00.pdf, 2003.
Stallings, William, "2.2 Communication Switching," Local Networks, 2nd Ed., 1987, pp. 32-33, 410-416, Macmillan Publishing Company, New York, NY.
Sterkel, Terrance E, "Re: VLAN Progress, Tagging, SDE etc.—Just Hold It Please," Email dated Nov. 23, 1995.
Stern, T.E., and Jiang, Song, "Multicast—Multihop Networks: Connectivity and Performance," Summary, Department of Electrical Engineering and CTR, Columbia University, pp. 1-8.
Steve <WITZ@CHIPCOM.COM>, "Re: IP Multicast, Floyd Backes's Presentation, Denver," Email dated Nov. 1, 1995.
Steve <WITZ1961@AOL.COM>, "Default VLAN," Email dated May 7, 1996.
Steve <WITZ1961@AOL.COM>, "Loop Issues," Email dated May 9, 1996.
Steve <WITZ1961@AOL.COM>, "VLAN Questions/Suggestions," Email dated May 6, 1996.
Stevens, W., "TCP Slow Start, Congestion Avoidance, Fast Retransmit, and Fast Recovery Algoriths," NOAO, Jan. 1997.
Strigini, Lorenzo, et al., "Multicast Services on High-Speed Interconnected LANs," Proceedings of the IFIP International Workshop on High Speed Local Area Networks, Feb. 1987, pp. 173-176.
Swedberg, G., "Ericsson's mobile location solutions," Ericsson Review No. 4, 1999.
Tang and Polk, "Spatial location BOF (spatial) of IETF," retrieved from www.nrc.nokia.com/ietf-spatial/.
Tang, Polk, Korkea-Aho and Takahashi, Internet Draft (Nov. 2000) entitled "Spatial Location Payload Requirements with Protocol Recommendations".
Tang, Ruuru, and Loughney, Internet Draft (Feb 14, 2000) entitled "Problems and Requirements of Some IP Applications Based on Spatial Location Information,".
Tannenbaum, Todd, and Conover, Joel, "Managing Your Switched Networks," Network Computing, Jun. 15, 1996.
Tasker, Robin, "Re: Revision to SDE," Email dated Nov. 27, 1995.
TCP Selevtive Acknoledgement option (and related changes) for FreeBSD, Sep. 1997.
Thaler, Pat, "Re: Revision to SDE," Email dated Nov. 27, 1995.
Thompson, Geoff, "Re: Re: Re: Revision to SDE," Email dated Nov. 27, 1995.
TrueSystems.com Inc. "HIPPAA & TRUESCCESS," 2001, p. 1.
US Patent Application File Wrapper 07/773,161.

Vielmetti, Edward et al., "Messages for Dec. 1992," Google Groups: comp.dcom.isdn, Message board thread, Dec. 1992.
Virtual Router Redundancy Protocol, Network Working Group Request for Comments: 2338.
Waitzman, D., et al., "Distance Vector Multicast Routing Protocol," Network Working Group—RFC 1075, Nov. 1988, pp. 1-24.
Wakerly, John, "An Efficient Frame-Tagging Format for VLANs," IEEE 802.1 Meeting Presentation, Jan. 24-25, 1996.
Wakerly, John, "FDDI VLAN Frame Format—Two Alternate Interpretations," Email dated Jun. 14, 1996.
Wakerly, John, "Forwarding Methods for VLAN-Tagged Frames in a Bridged LAN," IEEE 802.1 Meeting Presentation, Jan. 24-25, 1996.
Wakerly, John, "Implementation Subgroup Notes," Email dated Oct. 19, 1995, IEEE 802.1 Interim Meeting.
Wakerly, John, "Re: Default VLAN & loops," Email dated May 7, 1996.
Wakerly, John, "Re: Properties of Methods A and B for FDD1 and 802.5 VLAN Frame Format," Email dated Jun. 20, 1996.
Wakerly, John, "Technical Contributions for January Interim Meeting," Email dated Nov. 29, 1995.
Wakerty, John and Cheriton, David R., "Virtual LAN Management Protocol (VLMP)" IEEE 802.1 Meeting, Oct. 11-13, 1995, Alantec.
Wakerty, John, "Some VLAN Styles," IEEE 802.1 Meeting, Oct. 11-13, 1995, Alantec.
Wall, David Wayne, "Mechanisms for Broadcast and Selective Broadcast," Dissertation—Stanford University Graduate Studies, University Microfilms International, Jun. 1980, pp. 1-87.
Walther and Fischer, "LocaPhone—Location-Aware group Communication for Mobile Groups," retrieved from www.isoc.org/isoc/conferences/inet/01/CD_proceedings/T70/walther.pdf, Jul. 2002.
Wang, Peter, et al. "Email Voting Ballots: P802/D21: Overview and Architecture (second edition)," IEEE, Oct. 20, 1995.
Want et al., "The Active Badge Location System," ACM Trans Info. Sys., vol. 10, Jan 1992.
Ward, Jones and Hopper, "A new Location Technique for the Active Office," IEEE Personal Comm. vol. 4, Oct. 1997.
Warwick, Trevor, "Re: Flow control contribution," Email dated Mar. 14, 1995.
Waters, A.G., "Multicast Provision for High Speed Networks," Proceedings of the IFIP TC6/WG6.4 Fourth International Conference on High Speed Performance Networking, Liege, Belgium, Dec. 14-18, 1992, pp. 317-348.
Waters, Gillian A., et al., "The Use of Broadcast Techniques on the Universe Network," ACM, 1984, pp. 52-57.
Werb and Lanzl, "Designing a Positioning System for Finding Things and People Indoors," IEEE Spectrum, Sep. 1998.
Williamson R., "Introduction to Location based Services for Mobile Wireless Users," Approach to Training Situation Awareness, retrieved from www.ecdesignnetcom/papers/location%20Based%20Services%202002.htm, Jul. 2002.
Wright, Michele, "Re: VLAN Questions/Suggestions," Email dated May 6, 1996.
Wright, Michele, "Re[2]: VLAN Questions/Suggestions," Email dated May 7, 1996.
Written Opinion and Search Report from PCT US99/22919, Jan. 30, 2001 (10 pages).
Written Opinion from PCT/US03/06169, Aug. 13, 2005 (5 pages).
Yang, Henry and Rijsinghani, Anil, "Some VLAN Requirements & Considerations," IEEE 802.1 Maui, Jul. 11, 1995.
Zagami and Parl, "Providing a Universal Location Services Using a Wireless E911 Location Network," IEEE Communications Magazine, Apr. 1998.
Zipf, A., "User-Adaptive Maps for Location-Based Services (LBS) for Tourism," Proc. Of Enter Comm. Tech in Tourism, Innsbruck Austria, Springer Computer Science, 2002.
Zwicker, H.R., "Netzwerke—Die Informationstransporter der Moderne," Elektrotechnik, Jun. 1993.
Challenges for Mesh Networks in UWB Applications, UWB Insider,2004 [retrieved Dec. 1, 2006] from the Internet<URL: www.uwbinsider.com/technology/print/1_8_mesh_challenges.html>.

* cited by examiner

TIME SYNCHRONIZED WIRELESS METHOD AND OPERATIONS

RELATED APPLICATIONS

This application claims the priority of the following applications, which are herein incorporated by reference: U.S. Provisional Application No.: 60/694,560; filed 28 Jun. 2005, entitled: TIME SYNCHRONIZED WIRELESS METHOD AND OPERATIONS; and U.S. Provisional Application No.: 60/694,554; filed 28 Jun. 2005, entitled: INDEPENDENT CELL RESIZING OF TRANSMIT AND RECEIVE RF CELLS.

TECHNICAL FIELD

This disclosure relates to scanning methodologies and, more particularly, to multi-interval wireless scanning methodologies.

BACKGROUND INFORMATION

Various methods are used by communications systems to allow electronic devices such as computer devices to communicate and exchange signals, data and other types of messages and information. Systems such as LANs (Local Area Networks), the Internet and conventional telephone networks often link computers, phones and other devices. Another method in use today to allow mobile computers to communicate is the WLAN (Wireless Local Area Network). The I.E.E.E. or IEEE (Institute for Electrical and Electronics Engineers) 802.11 wireless networking standard, is an industry set of protocols that defines many of the standards that allow communications interoperability among the manufacturers and vendors of WLAN devices. The IEEE 802.11 standards specify several distinct OSI Physical Layer radio transmission mechanisms, such as radio frequencies, whereby signals may be transmitted over the wireless medium. A MAC (Medium Access Control) layer is also defined that organizes and controls the exchange of data packets delivering frames or messages between the communicating stations. The IEEE 802.11-19979 MAC also supports mechanisms whereby special IEEE 802.11, compliant wireless stations, called APs (Access Points) connect to a wired LAN, to bridge or connect, as a frame relay device, the wired and wireless portion of the network infrastructure. Often the wired LAN may further be connected to other networks or access the broader Internet. Mobile computers or PDAs connect to the APs wirelessly using 802.11 WLAN adapters or NICs (Network Interface Cards). These adapters may also be built directly into the devices seeking wireless connectivity.

As defined by the IEEE 802.11 standard, an AP (Access Point) is any device containing an IEEE 802.11-conformant MAC and PHY interface to the wireless medium that provides associated IEEE 802.11-compliant stations with access to the backbone infrastructure. Stated another way, the AP bridges the two network elements together to provide seamless communications from the wireless to the wired infrastructure in a bidirectional fashion.

Several IEEE 802.11 PHY (Physical layer) standards; IEEE 802.11a, IEEE 802.11b and IEEE 802.11g are showing worldwide acceptance. The 11 Mbps (MegaBit Per Second) IEEE 802.11b PHY, operating at 2.4 GHz and employing CCK (Complementary Code Keying) single carrier QPSK modulation, has been shipped since before 2000. The 54 Mbps IEEE 802.11a PHY, operating in the 5 GHz band and based on multiple carrier OFDM (Orthogonal Frequency Division Multiplex) signaling is seeing some acceptance for large company WLAN deployments. The IEEE has also standardized a combined CCK and OFDM-based extension to the 2.4 GHz 802.11b PHY called IEEE 802.11g which is gaining popularity.

With the increased popularity of mobile devices and wireless access come new applications using an increasing amount of bandwidth. In addition to an increasing number of wireless devices, many devices are becoming more mobile over time. Laptop PCs with built in wireless connectivity are replacing traditional desktop devices as the PC of choice. Users expect wireless connectivity not only throughout their enterprise and at home, but also at airports, cafes, hotels and other local "hot spots". With the increasing number of users, newer applications hungry for higher bandwidth and additional devices and services such as voice or streaming video, it's not surprising the bandwidth needs in the wireless space are ever increasing.

One method to increase available bandwidth is to more efficiently use the bandwidth currently available. Portions of the bandwidth in IEEE 802.11 networks are allocated using CSMA/CD. Having less bandwidth allocated in this manner or decreasing the number of "collisions" which occur are methods to gain added throughput from the RF channels available. IEEE 802.11 networks also rely on scanning as a necessary mechanism to facilitate operation of the network. Using active scanning techniques, a client can search for an AP or other stations to communicate with. This process usually involves the client sending probe requests on each channel it is configured to use and waiting for responses. The client then determines which AP or station is the ideal one to communicate with. Typically most clients have single radios. Thus, when the radio is used to scan a channel not used for data transfer useful bandwidth is lost. The client station or AP can also use passive scanning. As its name implies, the station does not transmit any frames but rather listens passively for beacon frames on each available channel. The client continues to change channels at a specified interval, just as with active scanning, but the client does not send probe requests. Active scanning is the most thorough mechanism used to find APs because it actively sends out 802.11 probes across all channels to find an AP. It requires the client to dwell on a particular channel for a set length of time waiting for the probe response.

With passive scanning, the client iterates through the channels slower than active scanning because it is listening for beacons that are sent out by APs at a set rate, such as ten beacons per second. The client must dwell on each channel for a longer time duration if it is unsure of the start of the beacon interval and to make sure it receives beacons from as many APs as possible for the given channel. The client looks for different information elements such as SSID, and supported rates to aid in selecting an appropriate AP or station for communications.

There is no ideal technique for scanning. Passive scanning has the benefit of not requiring the client to transmit probe requests but runs the risk of potentially missing an AP because it might not receive a beacon during the scanning duration. Active scanning has the benefit of actively seeking out APs to associate to but requires the client to actively transmit probe requests. Depending on the implementation for the 802.11 client and the services supported one technique might be better suited than the other. For example, many embedded systems use passive scanning as the preferred method, whereas 802.11 Voice over IP (VOIP) phones and PC client cards often rely on active scanning, trading off the lost bandwidth of active probing for the shorter time interval spent in scan mode. What is clear is that all single radio systems suffer from lost useful bandwidth while implementing the scanning function. While a second radio could eliminate the lost bandwidth, the second radio would add substantial cost to the wireless system.

SUMMARY OF DISCLOSURE

In a first implementation, a scanning method includes, during a first data scanning sequence including a plurality of discrete data scanning intervals, suspending data scanning operations during at least one discrete data scanning interval chosen from the plurality of discrete data scanning intervals. A data transmission operation is performed during the at least one discrete data scanning interval.

One or more of the following features may be included. During a subsequent data scanning sequence including the at least one discrete data scanning interval, a data scanning operation may be performed during the at least one discrete data scanning interval. The first data scanning sequence may be a first data scanning sequence for a first wireless communication channel. The subsequent data scanning sequence may be a subsequent data scanning sequence for the first wireless communication channel. A first data scanning sequence for a second wireless communication channel may be performed prior to performing the subsequent data scanning sequence for the first wireless communication channel.

In an alternative implementation, a computer program product residing on a computer readable medium having a plurality of instructions stored thereon which, when executed by a processor, cause the processor to perform operations including, during a first data scanning sequence including a plurality of discrete data scanning intervals, suspending data scanning operations during at least one discrete data scanning interval chosen from the plurality of discrete data scanning intervals. A data transmission operation is performed during the at least one discrete data scanning interval.

One or more of the following features may be included. During a subsequent data scanning sequence including the at least one discrete data scanning interval, a data scanning operation may be performed during the at least one discrete data scanning interval. The first data scanning sequence may be a first data scanning sequence for a first wireless communication channel. The subsequent data scanning sequence may be a subsequent data scanning sequence for the first wireless communication channel. A first data scanning sequence for a second wireless communication channel may be performed prior to performing the subsequent data scanning sequence for the first wireless communication channel. The computer readable medium may be included with a network addressable device, such as a wireless access point.

In an alternative implementation, a device configured to perform operations including, during a first data scanning sequence including a plurality of discrete data scanning intervals, suspending data scanning operations during at least one discrete data scanning interval chosen from the plurality of discrete data scanning intervals. A data transmission operation is performed during the at least one discrete data scanning interval.

One or more of the following features may be included. During a subsequent data scanning sequence including the at least one discrete data scanning interval, a data scanning operation may be performed during the at least one discrete data scanning interval. The first data scanning sequence may be a first data scanning sequence for a first wireless communication channel. The subsequent data scanning sequence may be a subsequent data scanning sequence for the first wireless communication channel. A first data scanning sequence for a second wireless communication channel may be performed prior to performing the subsequent data scanning sequence for the first wireless communication channel. The device may be a network addressable device, such as a wireless access point.

The details of one or more implementations is set forth in the accompanying drawings and the description below. Other features and advantages will become apparent from the description, the drawings, and the claims.

DETAILED DESCRIPTION OF THE PREFERRED EMBODIMENTS

Figure 1:
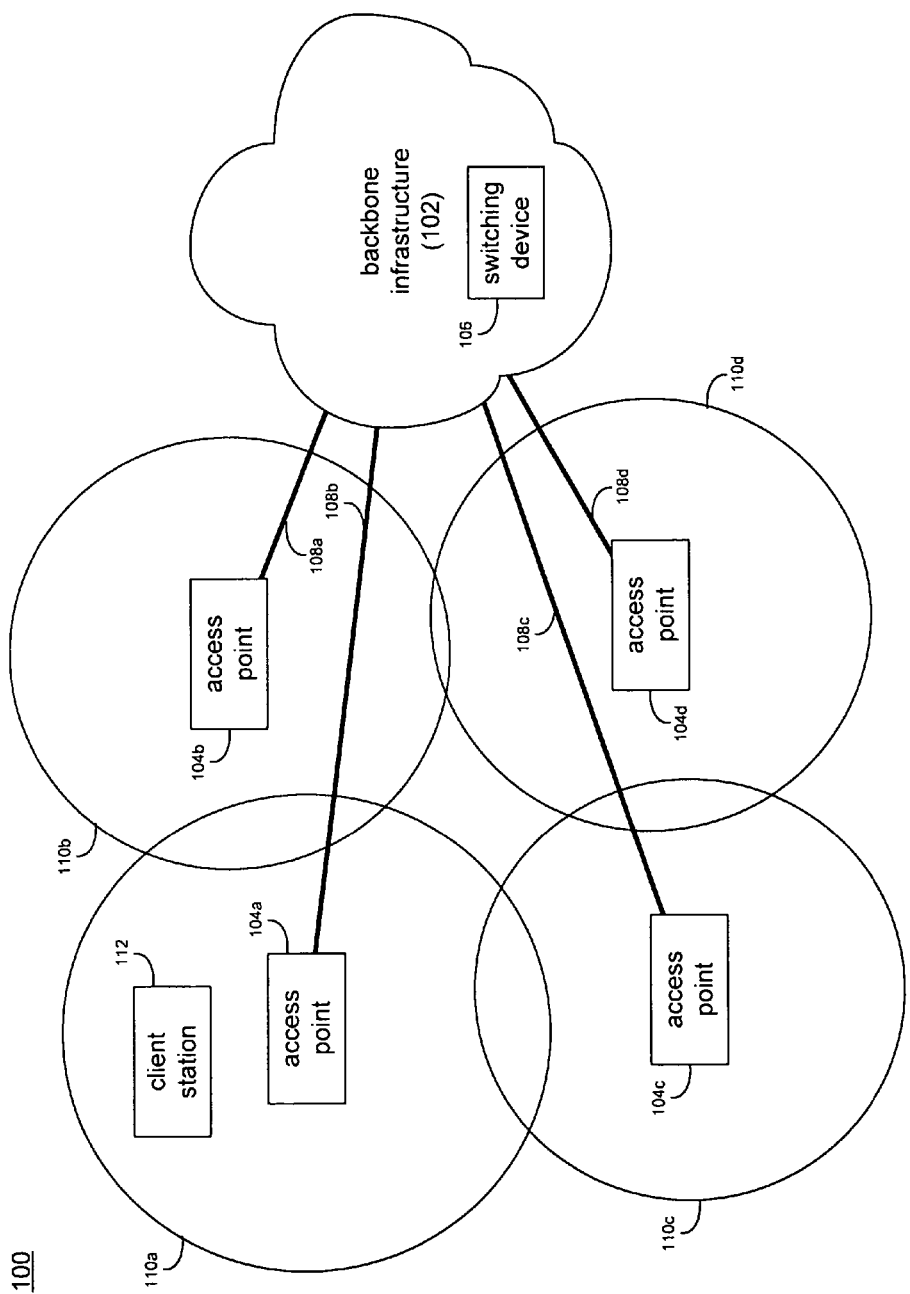
FIG. 1 is a diagrammatic view of a distributed computing network including a plurality of wireless access points coupled to a backbone infrastructure.

Referring to FIG. 1, there is shown a representative access point (i.e., AP) deployment 100 with a network/infrastructure backbone 102 as deployed in many present-day large and medium sized businesses. The access points (e.g., access points 104a, 104b, 104c, 104d) may be used to connect devices seeking connectivity in the radio frequency (i.e. RF) domain with the rest of the network. Access points 104a, 104b, 104c, 104d may be geographically dispersed to provide coverage at different locations. While shown in FIG. 1 as a two-dimensional coverage diagram, antenna types and structures may be designed to produce various RF patterns in three dimensions. Accordingly, the timing time synchronization function and the synchronous scanning functions may be applied to all antenna configurations, RF ranges, and dimensions of coverage.

Switching device 106, which may be part of backbone infrastructure 102, may switch/route data packets between access points (e.g., access points 104a, 104b, 104c, 104d) and various other devices, such as servers, computing devices and/or other networking devices. Connections 108a, 108b, 108c, 108d may couple access points (e.g., access points 104a, 104b, 104c, 104d respectively) to backbone infrastructure 102. An example of connections 108a, 108b, 108c, 108d may include a wired Ethernet 10/100 link, an optical conductor, or a wireless communication channel.

The area of RF coverage (i.e., the cell) for a particular wireless access point may be approximated by cells 110a, 110b, 110c, 110d that correspond to the RF coverage areas provided by access points 104a, 104b, 104c, 104d respectively. Depending on the placement and positioning of the access points (e.g., access points 104a, 104b, 104c, 104d), the respective coverage cells (e.g., cells 110a, 110b, 110c, 110d respectively) may or may not overlap. Coverage cells 110a, 110b, 110c, 110d represent areas of coverage that allow for the RF transmission of data to and RF reception of data from various station devices located within the coverage cells. For example, station device 112 (when suitably equipped) may be able to send data to and receive data from access point 104a. However, station device 112 may not be able to send data to and receive data from access points 104b, 104c, 104d (due to the location of station device 112 being outside of coverage cells 110b, 110c, 110d, respectively).

An access point (e.g., access point 104a) may actively manage the wireless traffic between all of the station devices with which e.g., access point 104a is associated. Traffic management may be accomplished using established standards such as the IEEE 802.11-1997 MAC standard that provides for the management and control of wireless packet exchanges between e.g., access point 104a and e.g., client station 112. The collection of specific packet exchange sequences that allow client stations (e.g., client station 112) to identify themselves as a valid network participants, to join or leave the wireless network, to establish and discontinue individual wireless sessions, and to manage the flow of individual data packet transmissions between stations may be referred to as a the WAP (i.e., wireless access protocol), an example of which includes IEEE 802.11-1997.

The 802.11-1997 MAC Wireless Access Protocol defines a set of specific management/control frame exchanges between an access point (e.g., access point 104a) and a client station (e.g., client station 112) that provide for network access, session setup and datagram traffic control. Wireless datagrams may include: network access frames (e.g., "Authentication Request", "Authentication Response" and "Deauthentication", for example); session setup frames (e.g., "Probe Request", "Probe Response", "Association Request", "Association Response", and "Disassociation", for example); and traffic control frames (e.g., "Beacon", "Request to Send", "Clear to Send", "Contention-Free End", and "ACK", for example).

Figure 2:
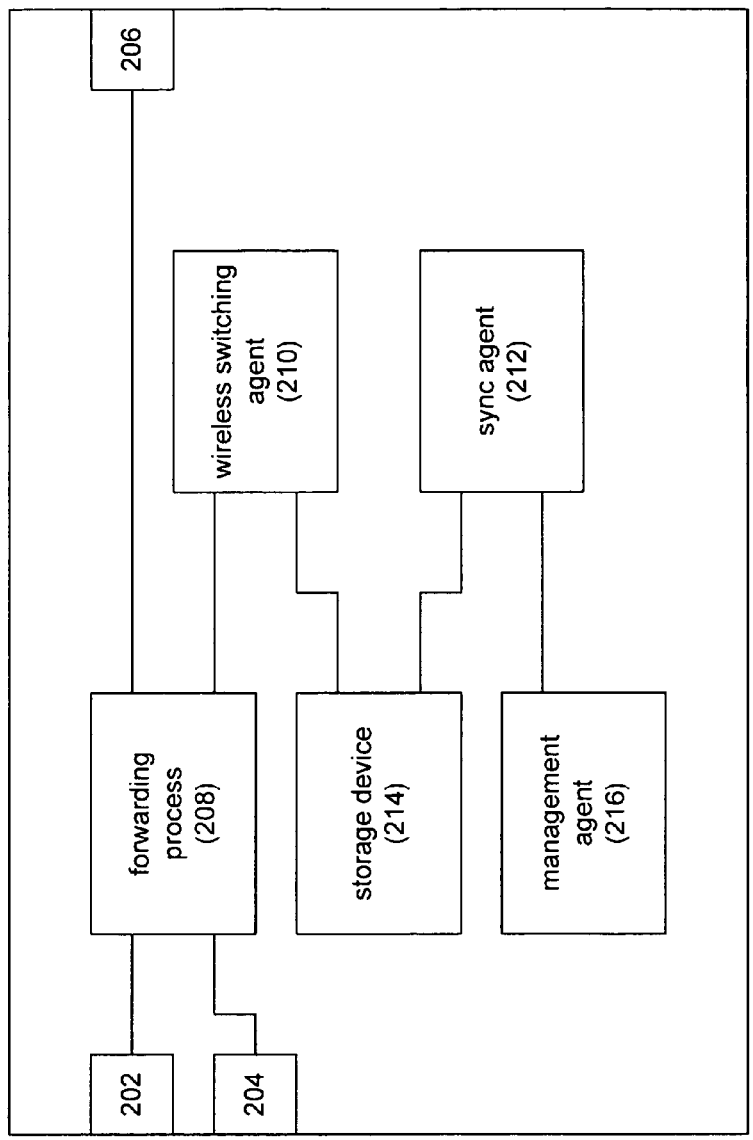
FIG. 2 is a diagrammatic view of a network switching device including a wireless switching agent and a sync agent.

Referring also to FIG. 2, there is shown a diagrammatic representation of a switching device 106. Switching device 106 may support and allow for IEEE 802.3 links to each of the plurality of access points (e.g., access points 104a, 104b, 104c, 104d) in the network. Switching device 106 may support switching/routing of frames between interfaces (e.g., interfaces 202, 204, 206). While switching device 106 is shown to include three interfaces (i.e., interfaces 202, 204, 206), the number and type of interfaces (e.g., wired, optical, wireless, infrared, etc.) may be varied depending on design criteria and requirements. Switching device 106 may include forwarding process 208 that allows for the forwarding, filtering, and modifying of data packets as required by the data protocol being utilized, and may support e.g., various frame relay functions (e.g., IEEE 802.1 D MAC bridging and TCP/IP routing.

Switching device 106 may include a wireless switching agent 210 that coordinates the attached or otherwise connected access points (e.g., access points 104a, 104b, 104c, 104d). For example, functions that are normally provided by the access points (e.g., access points 104a, 104b, 104c, 104d) may be offloaded/coordinated by wireless switching agent 210. Switching device 106 may include sync agent 212. Alternatively, sync agent 212 may be configured as a stand-alone device coupled to backbone infrastructure 102. Additionally/alternatively, sync agent 212 may be incorporated into other devices coupled to backbone infrastructure 102, such as client stations (e.g., client station 112), servers (not shown), access points (e.g., access points 104a, 104b, 104c, 104d), workstations (not shown), and various other networks devices (e.g., switches, hubs, routers, firewalls, gateways, etc.).

Switching device 106 may include a storage device 214 configured to store data frames, configuration parameters, operational code, management capabilities, device parameters, and device settings as required for switching operations. Examples of storage device 214 may include, but are not limited to, a hard disk drive, a tape drive, an optical drive, a RAID array, a random access memory (RAM), or a read-only memory (ROM).

Configuration and/or device parameters stored within storage device 214 may be communicated to other devices via management agent 216 (using encoding schemes and/or protocols, such as simple network management protocol). Communication of the configuration and/or device parameters may be communicated via wired communication channels, optical communication channels, wireless communication channels, and/or alternative communication means.

Figure 3:
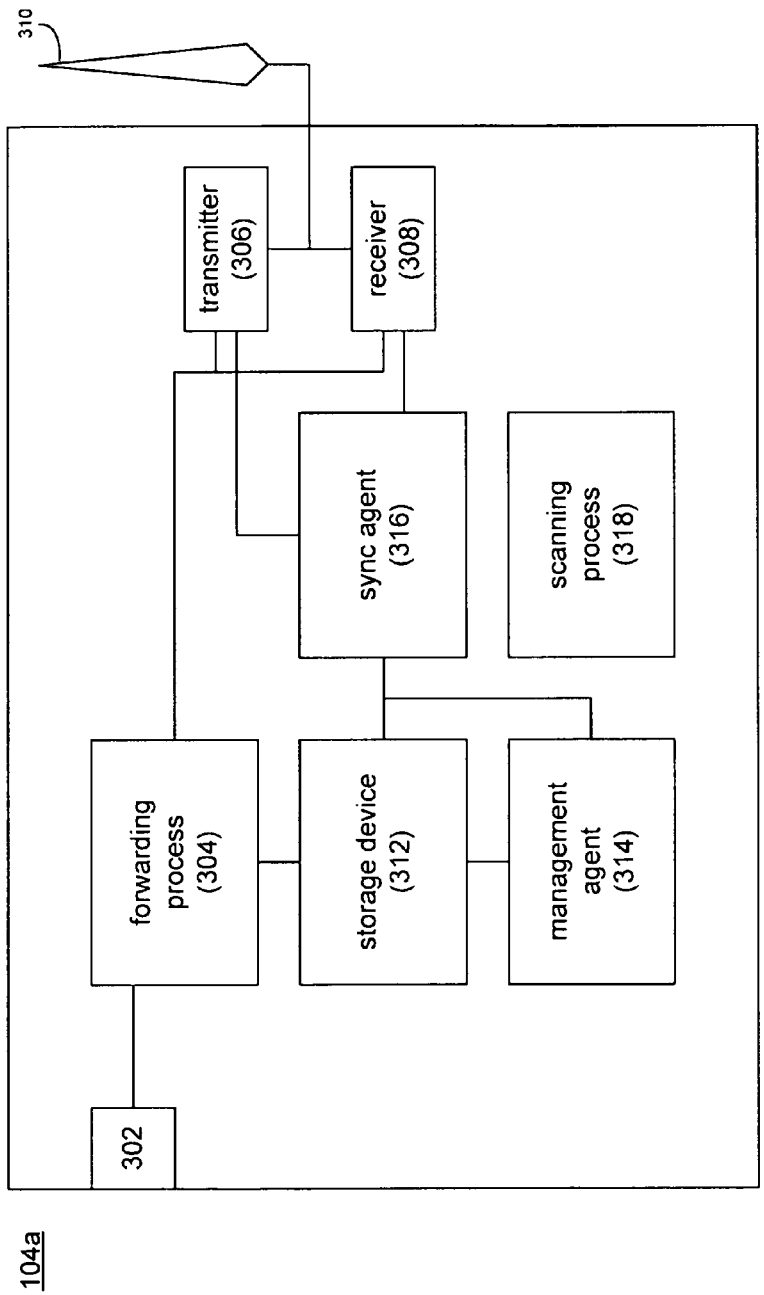
FIG. 3 is a diagrammatic view of one of the access points of FIG. 1 including a data scanning process.

Referring also to FIG. 3, there is shown a diagrammatic representation of an access point (e.g., access point 104a). Access point 104a may include one or more interfaces 302 for coupling access point 104a and backbone infrastructure 102. An example of interface 302 is an Ethernet interface.

Access point 104a may include forwarding process 304 that allows for the forwarding, filtering, and modifying of data packets as required by the data protocol being utilized, and may support e.g., various frame relay functions (e.g., IEEE 802.1D MAC bridging and TCP/IP routing. Access point 104a may include RF transmitter 306 and RF receiver 308, both of which may be coupled to antenna 310. RF transmitter 306 may allow for the conversion of data frames in data packets, and may allow these data packets to be wirelessly transmitted to a station device (e.g:, station device 112). RF receiver 308 may allow data packets to be wirelessly received from a station device (e.g., station device 112) and converted into data frames.

Access point 104a may include a storage device 312 configured to store data frames, configuration parameters, operational code, management capabilities, device parameters, and device settings as required for AP operations. Examples of storage device 312 may include, but are not limited to, flash memory, a hard disk drive, a tape drive, an optical drive, a RAID array, a random access memory (RAM), or a read-only memory (ROM).

Configuration and/or device parameters stored within storage device 312 may be communicated to other devices via management agent 314 (using encodings schemes and/or protocols, such as simple network management protocol). Communication of the configuration and/or device parameters may be communicated via wired communication channels, optical communication channels, wireless communication channels, and/or alternative communication means.

As discussed above, access point 104a may include a sync agent 316 that may establish a known timing reference for the access point (e.g., access point 104a) with respect to other access points. Sync agent 316 may be capable of communicating with other sync agents (e.g., sync agent 212) located within other access points (e.g., access point 101b, 101c, 101d).

The passing of configuration and/or device parameters (e.g., via a shared memory) may be utilized if multiple sync agents share common hardware and/or are located within a single device. As discussed above, sync agent 316 may located within an access point (e.g., access point 104a) or other network devices such as client stations (e.g., client station 112), servers (not shown), access points (e.g., access points 104b, 104c, 104d), workstations (not shown), and various other networks devices (e.g., switches, hubs, routers, firewalls, gateways, etc.).

Additionally, while sync agent 316 typically controls the timing parameters of a single access point, sync agent 316 (or a plurality of sync agents) may be configured to control the operation of a plurality of interfaces on a single access point, a plurality of access points, or a plurality of virtual access points; in either a hierarchical, flat, dual redundant or otherwise organized fashion.

As discussed above, sync agent 212 may be located in any client station. Additionally/alternatively, one or more sync agents may be used to control each wireless interface and/or each virtual wireless interface for devices so equipped. Sync agent functionality may additionally/alternatively be distributed about backbone infrastructure 102 in a hierarchical manner or other organized or self organized manner, with or without redundancy.

Communication between various sync agents (e.g., sync agent 316 and sync agent 212, for example) may occur using established protocols (e.g., simple network management protocol), or other appropriate protocol and/or communication methodologies. For enhanced security, an authenticated and secure communication path may be established between sync agents. Sync agent 316 may include a management interface (not shown) to allow for the setting/adjustment of the parameters of sync agent 316. Communication with sync agent 316 (for management purposes) may include a direct interface (e.g., an Ethernet or RS-232C link) or a specialized protocol (e.g., simple network management protocol).

Wireless switching agent 210 of switching device 106 may define a set of transmitting devices (e.g., client station 112) for a wireless network. Accordingly, any new transmitting device that joins the wireless network may receive data from and transmit data to the defined set of transmitting devices. If the new transmitting device is to have the same synchronization index as one or more of the defined set of transmitting devices, the new transmitting device may be provided with the address of the transmitting device (that includes the sync agent 316) with which the new transmitting device should be synchronized. In the event that multiple devices exist with which the new transmitting device may synchronize, wireless switching agent 210 may define which of the transmitting devices the new transmitting device should synchronize with.

Once the process of defining the transmitting device with which the new transmitting device should synchronize with is completed and any required lead times/lag times are defined, sync agent 316 may generate and transmit a time synchronized beacon signal that facilitates the synchronized transmission of data between the wireless transmitting devices included within the wireless network (e.g., access points 104a, 104b, 104c, 104d).

Synchronization of the new transmitting device and an existing transmitting device may be accomplished by listening for two consecutive time synchronized beacon signals so that the new transmitting device may define a beacon interval (i.e., the time between consecutive time synchronized beacon signals). The new transmitting device may then transmit a time synchronized beacon signal that is synchronized with the time synchronized beacon signals being transmitted by the existing transmitting device. This methodology, in turn, may insure that the beacon signals transmitted by the various devices (e.g., access points 104a, 104b, 104c, 104d) included within the wireless network are synchronized with each other, thus establishing a common time synchronization point across the wireless network.

Once a time synchronized beacon signal is established across a wireless network, synchronized data scans may be performed. A synchronized data scan (which may be executed by wireless switching agent 210) may allow all participating devices (or a portion thereof) to "listen" for network traffic within a specific channel until e.g., the expiry of a defined period of time and/or the occurrence of a defined condition or event. Such a condition or event may be e.g., the transmission of data from a specific source or to a specific destination.

The individual access points (e.g., access points 104a, 104b, 104c, 104d) may execute a data scanning process 318 that allows for the transmission of data during a data scanning sequence. The instruction sets and subroutines of data scanning process 318, which may be stored on storage device 312 coupled to access point 104a, may be executed by one or more processors (not shown) and one or more memory architectures (not shown) incorporated into access point 104a.

Typically, an access point (e.g., access point 104a) is a multi-channel device. For example, access point 104a may transmit and receive data on eleven discrete channels.

Figure 4:
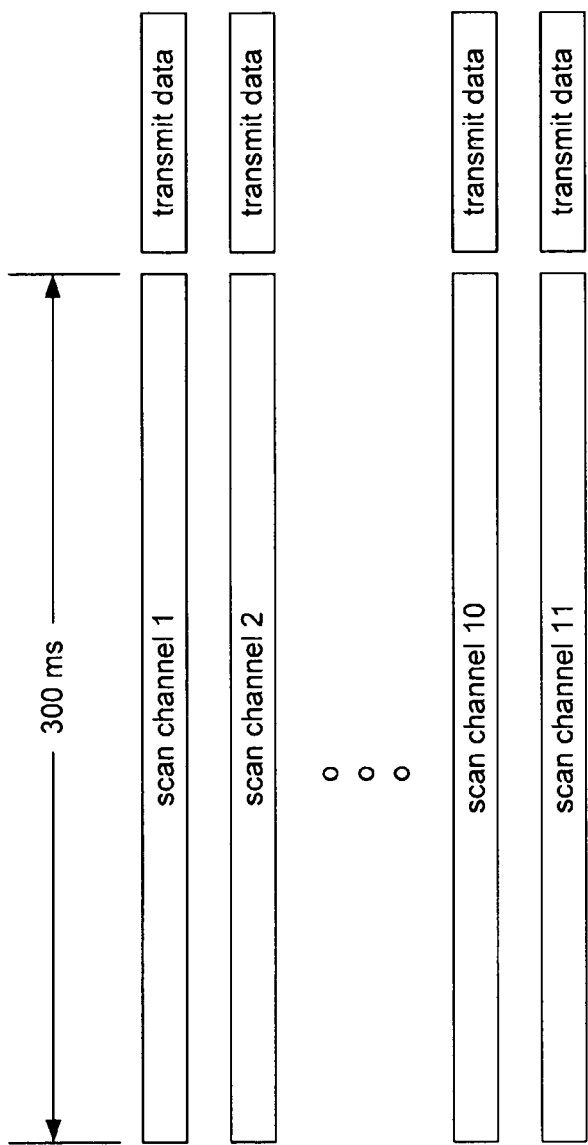
FIG. 4 is a diagrammatic view of a channel scanning sequence.

Referring also to FIG. 4, data scanning process 318 of access point 104a may perform a data scanning sequence by monitoring "channel 1" for a defined period of time to determine if a remote device (e.g., client station 112) is trying to transmit data to access point 104a on "channel 1". An example of this defined period of time may be 300 milliseconds. The defined period of time may be long enough to insure coverage for detection of devices that beacon on a periodic basis, and may be an interval at least twice the established beacon interval. Other devices may also transmit on a more random basis. Once this defined period of time has passed, access point 104a may transmit data that is available for transmission (within access point 104a) to one or more intended recipients. In the event that no data is available for transmission, data scanning process 318 may begin the next data scanning sequence, thus resulting in the scanning of "channel 2". Data scanning process 318 may repeat the scanning of channels until the last channel (e.g., "channel 11") is successfully scanned. Once completed, data scanning process 318 may be repeated and may once again scan "channel 1". Alternatively, the full scanning cycle of all of the channels may be scheduled to start again on the occurrence of some event or at some predetermined future time.

Unfortunately, while an increase in scanning time may result in quicker detection of remote devices, transmission delays may be increased. Certain types of data are more time-sensitive than other types of data. An example of such a time-sensitive data type is Voice-Over-IP (i.e., VoIP) data. Specifically, the human ear is highly sensitive to delays in VoIP data and extensive delays (e.g., >250 milliseconds) my render the system less desirable or unusable. Assume that VoIP data is available for transmission one millisecond after data scanning process 318 begins the data scanning sequence for "channel 1". As discussed above, this VoIP data may not be transmitted until after the data scanning sequence for "channel 1" is completed. Accordingly, as the defined period of time (in this example) is 300 milliseconds, the transmission of the VoIP data may be delayed for at least 299 milliseconds (i.e., an unacceptable delay).

Figure 5:
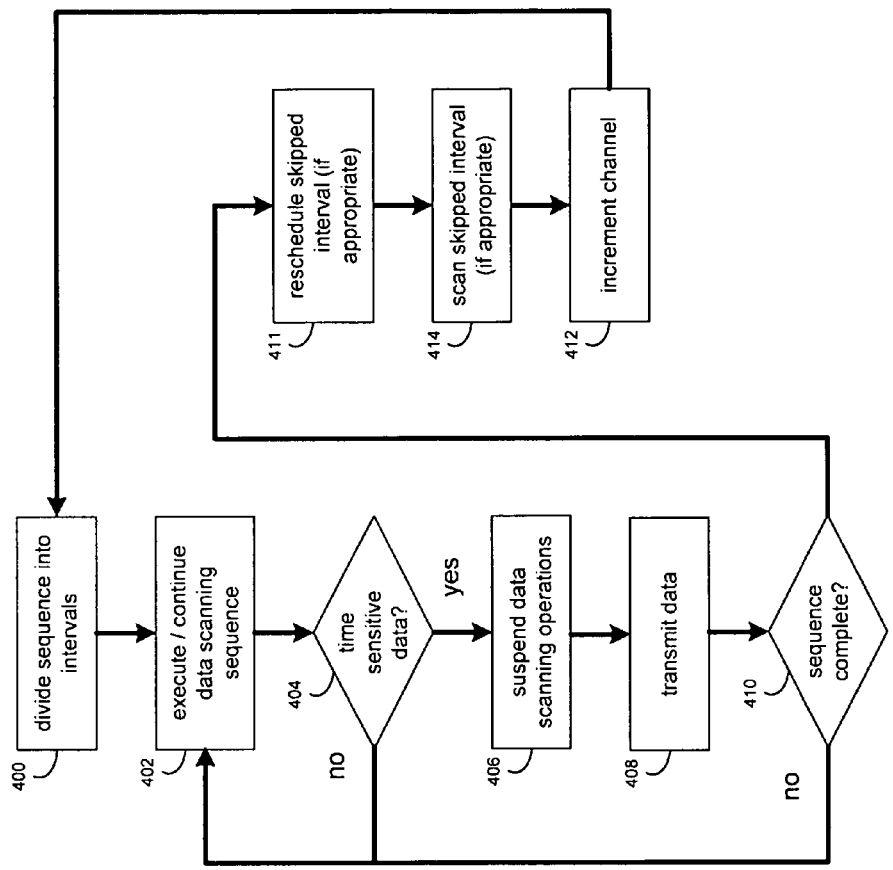
FIG. 5 is a flow chart of the data scanning process of FIG. 3.
Figure 6:
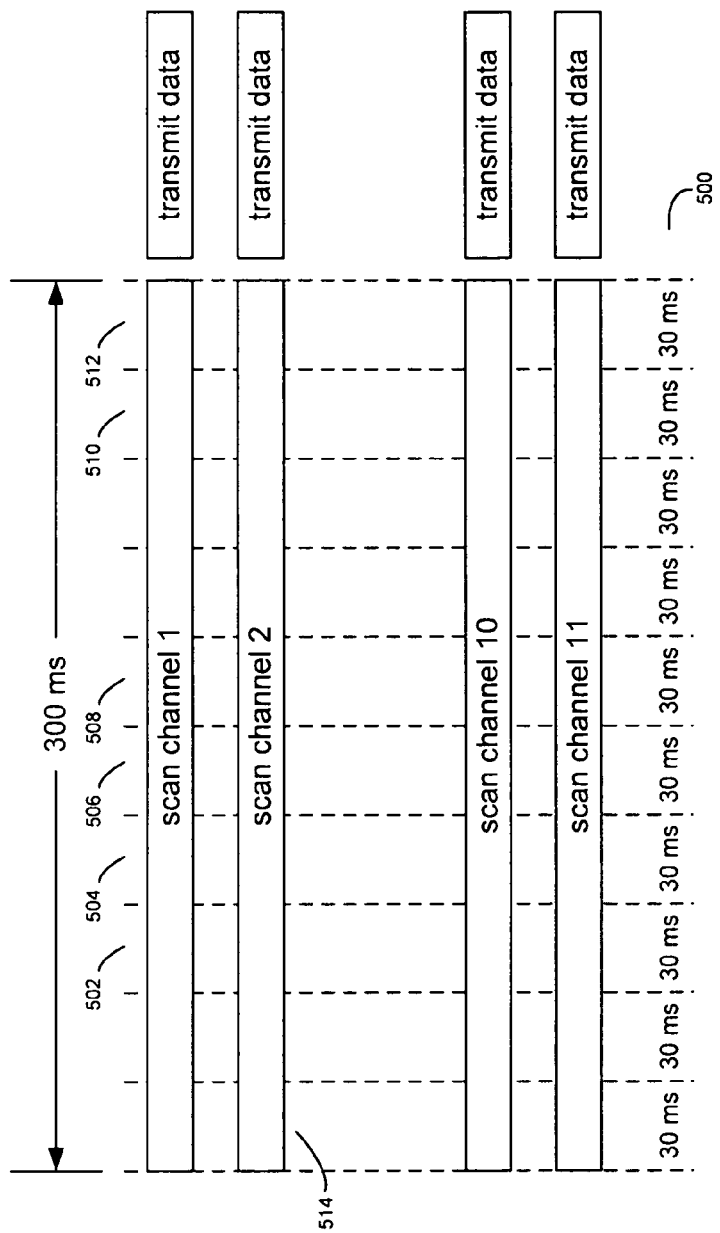
FIG. 6 is a diagrammatic view of a channel scanning sequence.

Accordingly and referring also to FIGS. 5 & 6, data scanning process 318 may divide 400 the data scanning sequence for each channel into a plurality of discrete data scanning intervals 500. For example, the above-described 300 millisecond defined period of time during which "channel 1" is scanned may be divided 400 into ten 30 millisecond discrete data scanning intervals.

Data scanning process 318 may execute 402 the data scanning sequence for the channel being scanned (e.g., "channel 1"). During this data scanning sequence, data scanning process 318 may monitor e.g., "channel 1" to determine if a remote device (e.g., access point 104b or client station 112) is attempting to transmit data to access point 104a. In the event that a remote device is indeed trying to transmit data to access point 104*a*, access point 104*a* and e.g., client station 112 may facilitate the transfer of data to access point 104*a* via "channel 1".

In the event that data is available for transmission from access point 104*a* to a remote device (e.g., client station 112), data scanning process 318 may make a determination 404 concerning whether the data is time-sensitive data (e.g., VoIP data or other high priority information or control). If the data is not time-sensitive data, transmission of the data may be delayed until the completion of the data scanning sequence for the channel (e.g., "channel 1"). However, if the data is indeed time-sensitive data, data scanning process 318 may suspend 406 data scanning operations for at least one of the discrete data scanning intervals to allow for the transmission 408 of the time-sensitive data. The exact length (i.e., the number of discrete data scanning intervals) of the suspension 406 may be determined based on the amount of time required to successfully transmit 408 the time-sensitive data. For example, if it takes 45 milliseconds to transmit 408 the time-sensitive data, the data scanning operations may be suspended 406 for two time intervals (i.e., for a total of 60 milliseconds). When determining whether or not data is time-sensitive data, the header information of the individual data packets may be processed. Other information may also be used to determine if the traffic should be classified as time-sensitive. For example, the addresses, protocol or any other fields within the packet may aid in the classification, including error detection and security settings. Management parameters and any other access point settings (such as buffer sizing, queue depths and number of active client and network parameters) may also be utilized. These and other parameters, such as throughput of clients, may also be used to determine which time interval (typically a beacon interval) the skipped scan interval(s) will be rescheduled to.

Once the data is successfully transmitted, the data scanning operations are resumed beginning with the next discrete data scanning interval. For example, if time-sensitive data is made available for transmission during the third 502 discrete data scanning interval, data scanning operations may be suspended during the fourth 504 and fifth 506 discrete data scanning intervals (i.e., assuming that it takes 45 milliseconds to successfully transmit the time-sensitive data). The data scanning operations may then be resumed during the sixth 508 discrete data scanning interval.

If 410 the data scanning sequence is complete, the skipped discrete data scanning intervals (e.g., fourth 504 and fifth 506 discrete data scanning intervals) may be rescheduled 411 for scanning during a subsequent data scanning sequence. Additionally, once the data scanning sequence is complete, the channel being scanned may be incremented 412 and the next channel may be scanned either immediately or after a determined delay (thus allowing for data transmissions and/or other actions to occur). For example, once the data scanning sequence for "channel 1" is completed, the next channel (i.e., "channel 2") may be scanned assuming no exception conditions.

Additionally, it may be possible for a suspension to span the data scanning sequence for multiple channels. For example, if time sensitive data is received during the ninth 510 discrete data scanning interval for "channel 1", a two interval suspension may result in the tenth 512 discrete data scanning interval of "channel 1" being suspended in addition to the first 514 data scanning interval for "channel 2".

In the event that time-sensitive data was received 404 and data scanning operations for one or more intervals were suspended 406 to allow for the transmission 408 of the time-sensitive data, when the data scanning operations are resumed, data scanning process 318 may prioritize the scanning 414 of any discrete data scanning interval(s) that were previously skipped due to a suspension. The rescheduling 411 of the scanning operation may be made after the completion of the current channel, the next channel or any other channel, depending on priority and scheduling and re-scheduling settings. Continuing with the above-stated example in which data scanning operations were suspended during the fourth 504 and fifth 506 discrete data scanning intervals of the data scanning sequence for "channel 1", when "channel 1" is subsequently rescanned (e.g., after the successful scanning of "channel 11"), data scanning process 318 may prioritize the scanning 414 of the previously-skipped discrete data scanning intervals (i.e., namely data scanning intervals 504, 506). The example shows the scanning interval being broken up into smaller scanning intervals. This approach allows the impact to latency sensitive traffic to be minimized and allows potentially more time to be spent scanning, thus providing better coverage for random access device determination. Further, the unique interval tracking and rescheduling allows a guaranteed detection of any transmission of a periodic nature (such as beacons).

A number of implementations have been described. Nevertheless, it will be understood that various modifications may be made. Accordingly, other implementations are within the scope of the following claim.

What is claimed is:

1. A scanning method comprising:
   during a data scanning process of one or more channels, wherein the data scanning process includes at least a first data scanning sequence, and wherein at least one of the one or more channels is subdivided into a plurality of discrete data scanning intervals:
   suspending data scanning operations before or during at least one discrete data scanning interval chosen from the plurality of discrete data scanning intervals, the suspending being based upon, at least in part, a type of data available for transmission;
   determining a last interval scanned, wherein the last interval scanned is determined based upon a completion of the data scanning process for a discrete data scanning interval prior to the suspending of data scanning operations;
   performing a data transmission operation during at least a portion of the first data scanning sequence; and
   during a subsequent data scanning sequence:
   performing a data scanning operation for a second discrete data scanning interval that is not subsequent to the last interval scanned.

2. The scanning method of claim 1 wherein:
   the first data scanning sequence is a first data scanning sequence for a first wireless communication channel; and
   the subsequent data scanning sequence is a subsequent data scanning sequence for the first wireless communication channel.

3. The scanning method of claim 2 further comprising:
   performing at least a portion of a first data scanning sequence for a second wireless communication channel prior to performing the subsequent data scanning sequence for the first wireless communication channel.

4. A computer program product residing on a computer readable medium having a plurality of instructions stored thereon which, when executed by a processor, cause the processor to perform operations comprising:
   during a data scanning process of one or more channels, wherein the data scanning process includes at least a first data scanning sequence, and wherein at least one of the one or more channels is subdivided into a plurality of discrete data scanning intervals:
suspending data scanning operations before or during at least one discrete data scanning interval chosen from the plurality of discrete data scanning intervals, the suspending being based upon, at least in part, a type of data available for transmission;
determining a last interval scanned, wherein the last interval scanned is determined based upon a completion of the data scanning process for a discrete data scanning interval prior to the suspending of data scanning operations;
performing a data transmission operation during at least a portion of the first data scanning sequence; and
during a subsequent data scanning sequence:
performing a data scanning operation for a second discrete data scanning interval that is not subsequent to the last interval scanned.

5. The computer program product of claim 4 wherein:
the first data scanning sequence is a first data scanning sequence for a first wireless communication channel; and
the subsequent data scanning sequence is a subsequent data scanning sequence for the first wireless communication channel.

6. The computer program product of claim 5 further comprising instructions for performing operations comprising:
performing at least a portion of a first data scanning sequence for a second wireless communication channel prior to performing the subsequent data scanning sequence for the first wireless communication channel.

7. The computer program product of claim 4 wherein the computer readable medium is included with a network addressable device configured to control one or more data scanning sequences in one or more devices.

8. The computer program product of claim 7 wherein the network addressable device is at least one of a wireless access point and a wireless switch.

9. A device configured to perform operations comprising:
during a data scanning process of one or more channels, wherein the data scanning process includes at least a first data scanning sequence, and wherein at least one of the one or more channels is subdivided into a plurality of discrete data scanning intervals:
suspending data scanning operations before or during at least one discrete data scanning interval chosen from the plurality of discrete data scanning intervals, the suspending being based upon, at least in part, a type of data available for transmission;
determining a last interval scanned, wherein the last interval scanned is determined based upon a completion of the data scanning process for a discrete data scanning interval prior to the suspending of data scanning operations;
performing a data transmission operation during at least a portion of the first data scanning sequence; and
during a subsequent data scanning sequence:
performing a data scanning operation for a second discrete data scanning interval that is not subsequent to the last interval scanned.

10. The device of claim 9 wherein:
the first data scanning sequence is a first data scanning sequence for a first wireless communication channel; and
the subsequent data scanning sequence is a subsequent data scanning sequence for the first wireless communication channel.

11. The device of claim 10, the device further configured to perform operations comprising:
performing at least a portion of a first data scanning sequence for a second wireless communication channel prior to performing the subsequent data scanning sequence for the first wireless communication channel.

12. The device of claim 9 wherein the device is a network addressable device configured to control one or more data scanning sequences in one or more devices.

13. The device of claim 12 wherein the network addressable device is at least one of a wireless access point and a wireless switch.

14. The scanning method of claim 1 further comprising storing a position corresponding to at least one of a completed, suspended, and skipped discrete data scanning interval.

15. The scanning method of claim 14 further comprising resuming data scanning at at least one of the completed, suspended, and skipped data scanning interval.

16. The scanning method of claim 14 further comprising rescheduling the skipped discrete data scanning interval for scanning during a subsequent data scanning sequence.

17. The scanning method of claim 1 further comprising prioritizing the scanning of a previously skipped discrete data scanning interval.

* * * * *